US011995181B2

United States Patent
Kishikawa et al.

(10) Patent No.: US 11,995,181 B2
(45) Date of Patent: May 28, 2024

(54) VEHICLE SURVEILLANCE DEVICE AND VEHICLE SURVEILLANCE METHOD

(71) Applicant: Panasonic Intellectual Property Corporation of America, Torrance, CA (US)

(72) Inventors: Takeshi Kishikawa, Osaka (JP); Ryo Hirano, Osaka (JP); Yoshihiro Ujiie, Osaka (JP); Tomoyuki Haga, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 274 days.

(21) Appl. No.: 17/380,209

(22) Filed: Jul. 20, 2021

(65) Prior Publication Data

US 2021/0349977 A1   Nov. 11, 2021

Related U.S. Application Data

(63) Continuation of application No. PCT/JP2020/031228, filed on Aug. 19, 2020.

(30) Foreign Application Priority Data

Aug. 30, 2019   (WO) .................. PCT/JP2019/034263

(51) Int. Cl.
*G06F 21/55* (2013.01)
*B60W 40/09* (2012.01)
(Continued)

(52) U.S. Cl.
CPC .......... *G06F 21/552* (2013.01); *B60W 40/09* (2013.01); *B60W 40/12* (2013.01); *G06F 21/14* (2013.01);
(Continued)

(58) Field of Classification Search
CPC ........ G06F 21/552; G06F 21/14; G06F 21/55; H04L 63/1425; H04W 4/48; B60W 40/09; B60W 40/12
See application file for complete search history.

(56) References Cited

U.S. PATENT DOCUMENTS

2014/0328352 A1   11/2014   Mabuchi et al.
2015/0066239 A1   3/2015   Mabuchi
(Continued)

FOREIGN PATENT DOCUMENTS

JP   2013-131907   7/2013
JP   5664799   2/2015
(Continued)

OTHER PUBLICATIONS

Sharma, Priyanka; Möller, Dietmar P.F.; "Protecting ECUs and Vehicles Internal Networks," 2018 IEEE International Conference on Electro/Information Technology (EIT), Rochester, MI, USA, 2018, pp. 465-470.*

(Continued)

*Primary Examiner* — Victor Lesniewski
(74) *Attorney, Agent, or Firm* — GREENBLUM & BERNSTEIN, P.L.C.

(57) ABSTRACT

A vehicle surveillance device for an in-vehicle network system that includes one or more electronic control units includes: a frame transmitter and receiver that receives a frame flowing over the in-vehicle network system; and a score calculator that detects a suspicious behavior different from a normal driving behavior based on the frame received by the frame transmitter and receiver and vehicle data including information on one or more frames received by the frame transmitter and receiver prior to receiving the frame, and calculates, based on a detection result, a score indicating (Continued)

a likelihood that reverse engineering has been performed on a vehicle provided with the in-vehicle network system.

12 Claims, 14 Drawing Sheets

(51) Int. Cl.
*B60W 40/12* (2012.01)
*G06F 21/14* (2013.01)
*H04L 9/40* (2022.01)
*H04W 4/48* (2018.01)

(52) U.S. Cl.
CPC .......... *G06F 21/55* (2013.01); *H04L 63/1425* (2013.01); *H04W 4/48* (2018.02)

(56) References Cited

U.S. PATENT DOCUMENTS

| | | | |
|---|---|---|---|
| 2015/0163242 A1* | 6/2015 | Laidlaw | H04L 63/1425 726/22 |
| 2017/0013005 A1 | 1/2017 | Galula et al. | |
| 2018/0196941 A1* | 7/2018 | Ruvio | H04L 63/0227 |
| 2018/0255072 A1 | 9/2018 | Takada et al. | |
| 2018/0295147 A1 | 10/2018 | Haga et al. | |
| 2018/0367554 A1* | 12/2018 | Allouche | G06F 21/554 |
| 2019/0007427 A1* | 1/2019 | Yajima | H04L 63/108 |
| 2019/0068630 A1* | 2/2019 | Valecha | H04L 63/20 |
| 2019/0104149 A1* | 4/2019 | Zeng | H04L 9/12 |
| 2019/0104204 A1* | 4/2019 | Kawakami | H04L 69/22 |
| 2019/0140778 A1 | 5/2019 | Kishikawa et al. | |
| 2019/0312892 A1* | 10/2019 | Chung | G06F 21/554 |
| 2019/0371085 A1 | 12/2019 | Kishikawa et al. | |
| 2020/0057872 A1* | 2/2020 | Ingraham | H04L 9/085 |
| 2020/0067955 A1* | 2/2020 | Hass | H04L 12/4625 |
| 2020/0106826 A1* | 4/2020 | Kulkarni | H04W 4/48 |
| 2020/0216027 A1* | 7/2020 | Deng | H04L 63/1416 |
| 2020/0342099 A1* | 10/2020 | Kerstein | G06F 21/554 |
| 2020/0394341 A1* | 12/2020 | Bitton | G06F 21/85 |
| 2021/0006571 A1* | 1/2021 | Yi | H04L 63/1416 |
| 2021/0006578 A1* | 1/2021 | El-Moussa | G06N 7/01 |
| 2021/0021610 A1* | 1/2021 | Ahire | H04L 67/12 |
| 2021/0203682 A1* | 7/2021 | Bajpai | G06F 21/55 |
| 2024/0080335 A1* | 3/2024 | Dani | H04L 63/1425 |

FOREIGN PATENT DOCUMENTS

| | | |
|---|---|---|
| JP | 2018-190465 | 11/2018 |
| WO | 2017/038422 | 3/2017 |
| WO | 2018/168291 | 9/2018 |
| WO | 2019/142458 | 7/2019 |

OTHER PUBLICATIONS

Tyree, Zachariah; Bridges, Robert A.; Combs, Frank L.; Moore, Michael R.; "Exploiting the Shape of CAN Data for In-Vehicle Intrusion Detection," 2018 IEEE 88th Vehicular Technology Conference (VTC-Fall), Chicago, IL, USA, 2018, pp. 1-5.*

Fowler, Daniel S.; Bryans, Jeremy; Shaikh, Siraj Ahmed; Wooderson, Paul; "Fuzz Testing for Automotive Cyber-Security," 2018 48th Annual IEEE/IFIP International Conference on Dependable Systems and Networks Workshops (DSN-W), Luxembourg, Luxembourg, 2018, pp. 239-246.*

Bellovin, "Guidelines for Specifying the Use of IPsec Version 2", Network Working Group, RFC 5406, BCP 146, Best Current Practice, Feb. 2009, pp. 1-13.

International Search Report issued in International Pat. Appl. No. PCT/JP2020/031228, dated Nov. 24, 2020, along with an English translation thereof.

International Search Report issued in International Pat. Appl. No. PCT/JP2019/034263, dated Nov. 12, 2019, along with an English translation thereof.

Extended European Search Report dated Sep. 26, 2022 issued in European patent application No. 20859607.2.

* cited by examiner

FIG. 4A

| Score |
|---|
| 80 |

FIG. 4B

| Criterion | Present value | Previous value |
|---|---|---|
| Stopped time proportion | 70% | 50% |
| Interval emergency brake is activated | 60(sec.) | – |
| Interval cruise control is activated | – | 1000(sec.) |
| Interval automatic parking assist is activated | 30(sec.) | – |
| Interval sudden acceleration is detected | – | – |
| Interval sudden braking is detected | – | – |
| Interval sudden steering is detected | – | – |
| Interval error frame occurs | 1(sec.) | – |
| Message interruption time | 3(sec.) | 0(sec.) |
| Presence of battery voltage drop or presence of battery removal | Present | Absent |
| Number of times diagnosis command is received | 0 | 0 |
| Number of times update command is received | 0 | 0 |
| Successive button pressing count | 30(times) | 3(times) |
| Presence of third party device connection | Present | Absent |

FIG. 5

| ID | Origin of transfer | Destination of transfer |
|---|---|---|
| 0x100 | Bus 1 | Bus 2、3、4 |
| 0x200 | Bus 2 | Bus 3 |
| 0x250 | Bus 2 | Bus 4 |
| 0x300 | Bus 3 | Bus 1 |
| ... | ... | ... |

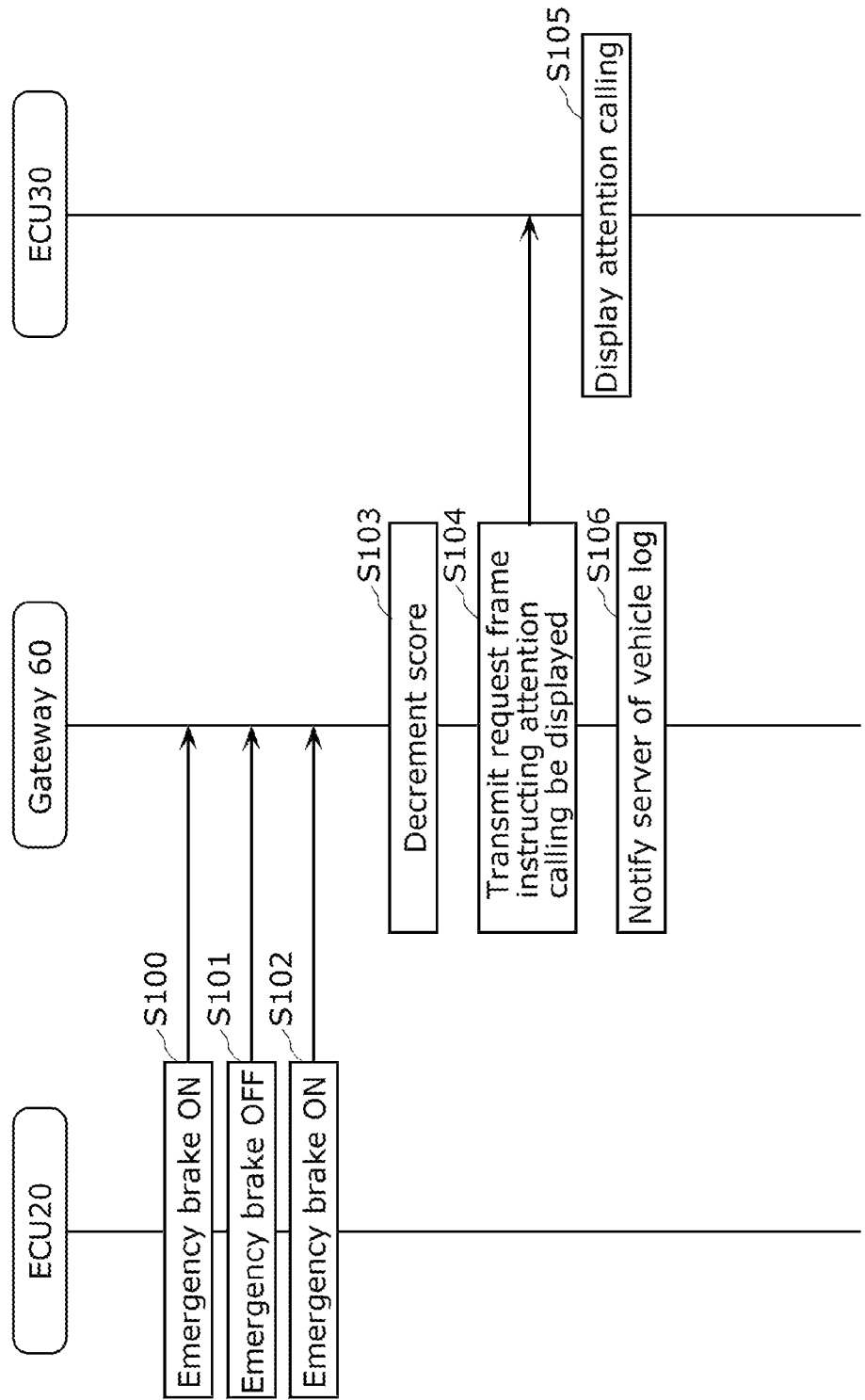

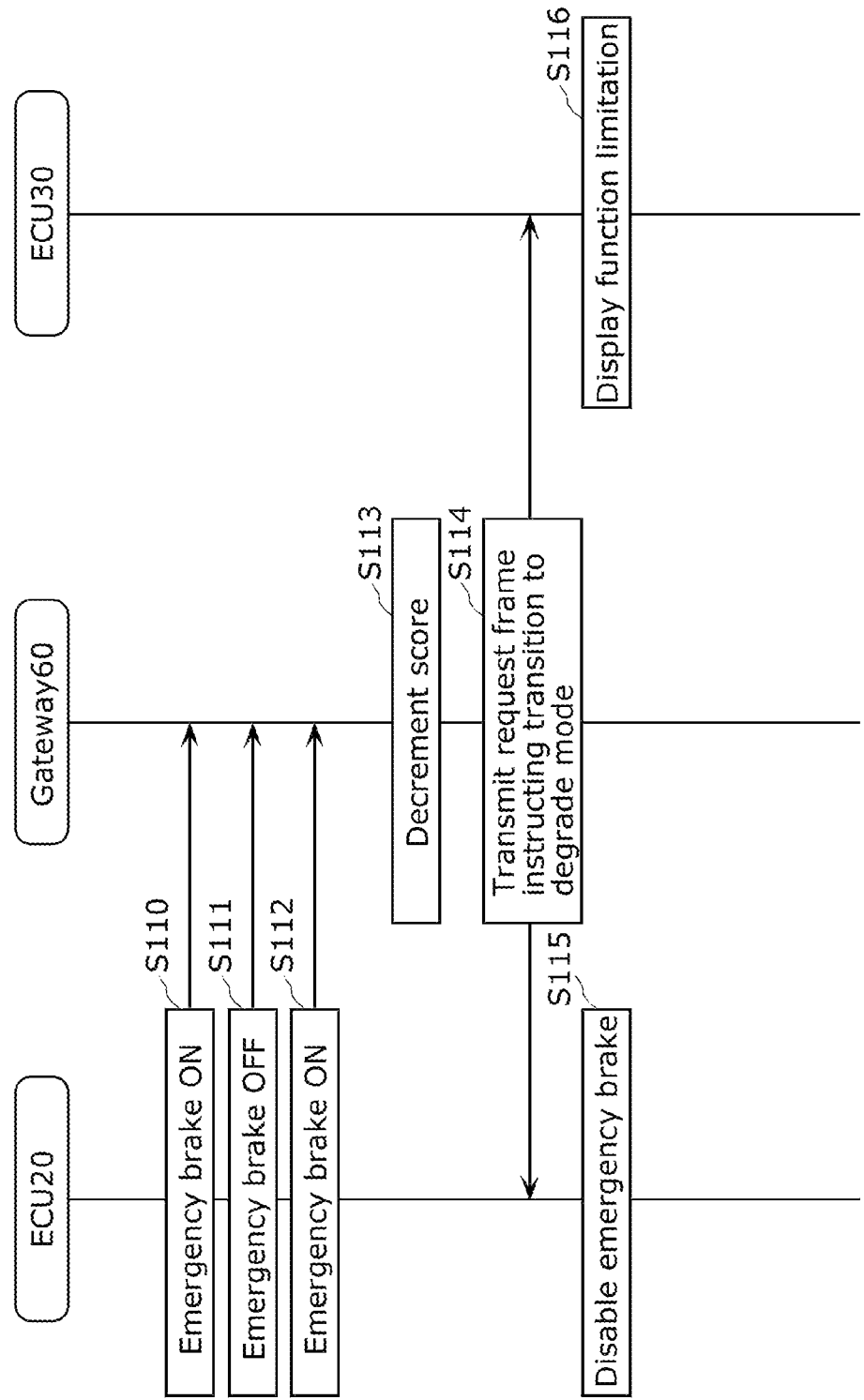

VEHICLE SURVEILLANCE DEVICE AND VEHICLE SURVEILLANCE METHOD

CROSS REFERENCE TO RELATED APPLICATIONS

This is a continuation application of PCT International Application No. PCT/JP2020/031228 filed on Aug. 19, 2020, designating the United States of America, which is based on and claims priority of PCT International Application No. PCT/JP2019/034263 filed on Aug. 30, 2019. The entire disclosures of the above-identified applications, including the specifications, drawings and claims are incorporated herein by reference in their entirety.

FIELD

The present disclosure relates to a vehicle surveillance device and a vehicle surveillance method for conducting surveillance of an in-vehicle network system that includes one or more electronic control units (hereinafter, ECUs).

BACKGROUND

Nowadays, many devices called ECUs are disposed in a system within an automobile. The network that connects these ECUs is called an in-vehicle network. There are many in-vehicle network standards, and a standard called the controller area network (hereinafter, CAN (registered trademark)) is one of the most widely adopted in-vehicle network standards. Moreover, with the spread of automatic driving or connected cars, in-vehicle Ethernet (registered trademark, hereinafter the same) is becoming widespread in order to meet the increase in the in-vehicle network traffic.

Meanwhile, there has been a reported threat that enters an in-vehicle network to gain unauthorized control of the vehicle. In addressing such a threat, Non Patent Literature 1 discloses a method of preventing unauthorized control that could be gained via communication performed by an unauthorized node, and this method uses encrypted communication that has been used in conventional Internet Protocol (IP) communication. In addition, Patent Literature 1 discloses a method of detecting anomalous communication in an in-vehicle network and blocking an unauthorized frame.

CITATION LIST

Patent Literature

PTL 1: Japanese Patent No. 5664799

Non Patent Literature

NPL 1: RFC 5406: Guidelines for Specifying the Use of IPsec Version 2, February 2009.

SUMMARY

Technical Problem

Despite the above, since the method disclosed in Non Patent Literature 1 uses encrypted communication, this necessitates encryption and decryption processing at a transmitting or receiving node and causes an overhead. Moreover, managing keys to be used in the encrypted communication becomes important in the stated method, and if the control of an ECU is taken over and a legitimate key is used, this allows for unauthorized control through transmission of an unauthorized frame.

Furthermore, the method disclosed in Patent Literature 1 merely provides a measure against an instance in which an unauthorized frame has been transmitted by an attacker and does not necessarily prevent an attack. In this manner, there is still room for improvement in the security of an in-vehicle network.

Accordingly, the present disclosure provides a vehicle surveillance device and a vehicle surveillance method that can further increase the security of an in-vehicle network.

Solution to Problem

A vehicle surveillance device according to one aspect of the present disclosure is a vehicle surveillance device that conducts surveillance of an in-vehicle network system that includes one or more electronic control units, and the vehicle surveillance device includes: a frame receiver that receives a frame flowing over the in-vehicle network system; and a score calculator that: detects a suspicious behavior different from a normal driving behavior based on the frame received by the frame receiver and vehicle data including information on one or more frames received by the frame receiver prior to receiving the frame; and calculates, based on a detection result, a score indicating a likelihood that reverse engineering has been performed on a vehicle provided with the in-vehicle network system.

A vehicle surveillance method according to one aspect of the present disclosure is a vehicle surveillance method of conducting surveillance of an in-vehicle network system that includes one or more electronic control units, and the vehicle surveillance method includes: receiving a frame flowing over the in-vehicle network system; and detecting a suspicious behavior different from a normal driving behavior based on the frame received in the receiving and vehicle data including information on one or more frames received prior to the frame received in the receiving, and calculating, based on a detection result, a score indicating a likelihood that reverse engineering has been performed on a vehicle provided with the in-vehicle network system.

Advantageous Effects

The vehicle surveillance device and so on according to one aspect of the present disclosure can further increase the security of an in-vehicle network.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4A is a diagram illustrating an example of a score according to Embodiment 1.

FIG. 4B is a diagram illustrating an example of vehicle data according to Embodiment 1.

FIG. 5 is a diagram illustrating an example of a transfer rule according to Embodiment 1.

FIG. 9 is a diagram illustrating a sequence of operations performed by the gateway according to Embodiment 1.

FIG. 10 is another diagram illustrating the sequence of operations performed by the gateway according to Embodiment 1.

Figure 1:
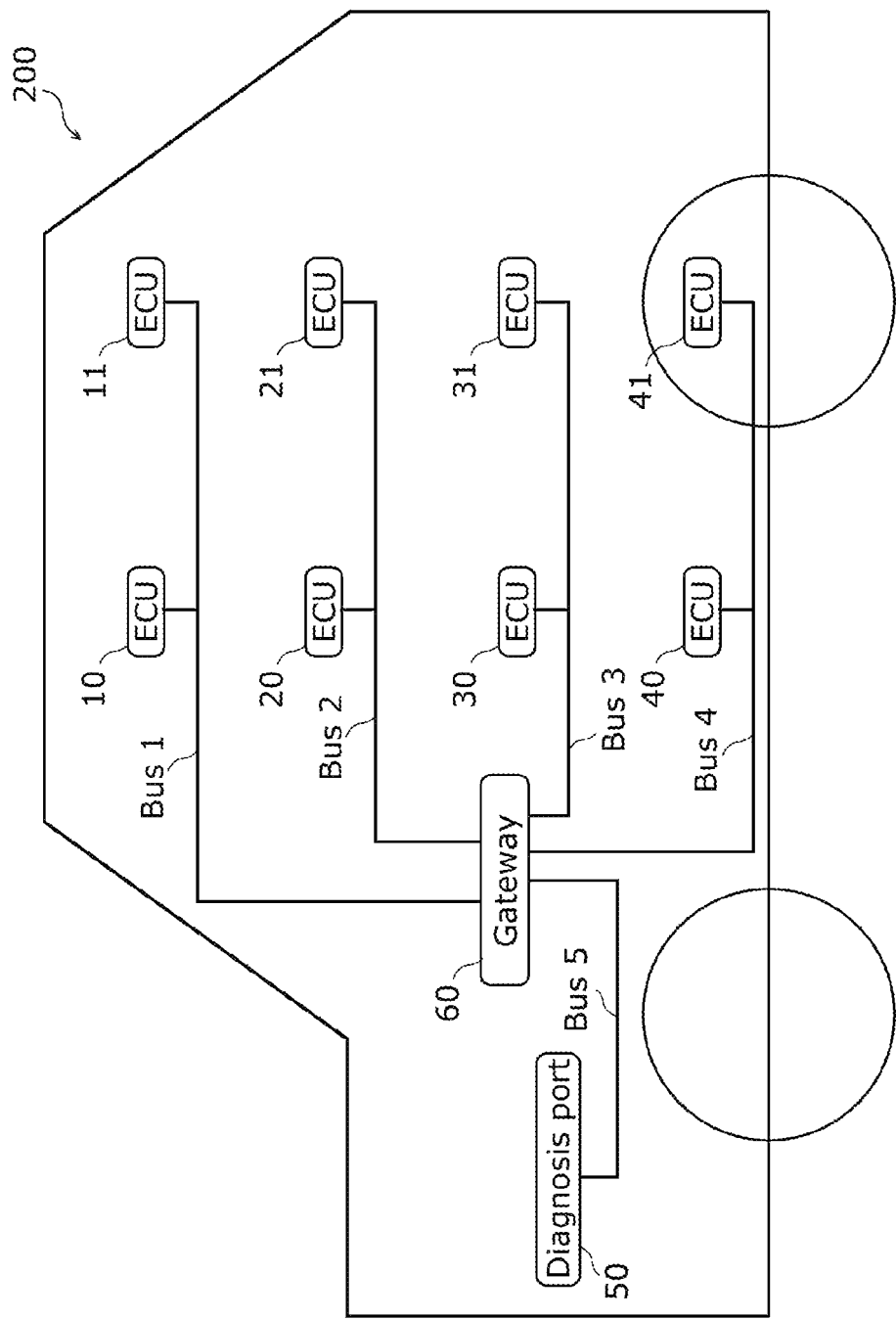
FIG. 1 is a diagram illustrating an overall configuration of an in-vehicle network system according to Embodiment 1.

DESCRIPTION OF EMBODIMENTS (Underlying Knowledge Forming Basis of the Present Disclosure)

Prior to describing the embodiments and so on according to the present disclosure, the underlying knowledge forming the basis of the present disclosure will be described.

As described above, the techniques disclosed in Patent Literature 1 and Non Patent Literature 1 have room for improvement in terms of increasing the security of an in-vehicle network.

In a typical and conceivable case, an attacker who attempts to gain unauthorized control of a vehicle performs in advance reverse engineering, such as an investigation into frames, on the in-vehicle network for gaining unauthorized control of the vehicle to establish a method for an attack.

If the attacker's activity in the stage of investigating the in-vehicle network performed prior to gaining unauthorized control of the vehicle can be captured, this can lead to an action for preventing the reverse engineering performed by the attacker serving as a sign of an occurrence of an attack or for conducting intense surveillance of a target vehicle to capture the content of the foreseeable attack.

Accordingly, the present inventors have diligently contemplated vehicle surveillance devices and so on that can capture the activities of an attacker in the stage of investigating an in-vehicle network and conceived of a vehicle surveillance device and so on described below. For example, the present inventors have found that an activity of an attacker in the stage of investigating an in-vehicle network can be captured by conducting surveillance of frames in the in-vehicle network, capturing behaviors of the vehicle that differ from the behaviors observed in a normal state and that could arise because of the reverse engineering performed by the attacker, and calculating the likelihood that the vehicle is being reverse engineered.

A vehicle surveillance device according to one embodiment of the present disclosure is a vehicle surveillance device that conducts surveillance of an in-vehicle network system that includes one or more electronic control units, and the vehicle surveillance device includes a frame receiver and a score calculator. The frame receiver receives a frame flowing over the in-vehicle network system. The score calculator detects a suspicious behavior different from a normal driving behavior based on the frame received by the frame receiver and vehicle data including information on one or more frames received by the frame receiver prior to receiving the frame. The score calculator further calculates, based on a detection result, a score indicating a likelihood that reverse engineering has been performed on a vehicle provided with the in-vehicle network system.

This configuration makes it possible to calculate the likelihood (the score) that the in-vehicle network system is being reverse engineered, which provides an advantage in that a more suspicious vehicle can be grasped. In other words, the vehicle surveillance device can capture, based on the score, an activity of an attacker at a stage where the attacker is investigating the in-vehicle network before actually gaining unauthorized control of the vehicle, and thus the security of the in-vehicle network of the vehicle can be further increased.

The suspicious behavior may be detected as a passive monitoring activity when any one of a connection of a surveillance device, an error frame, a network interruption, and battery removal is detected, and the score calculator may lower the score in response to detecting the passive monitoring activity.

This configuration makes it possible to capture an attempt where the attacker tries to acquire a log of the in-vehicle network system, and this provides an advantage. In other words, the vehicle surveillance device can capture the passive monitoring activity based on the score, and thus the security of the in-vehicle network of the vehicle can be further increased.

The suspicious behavior may be detected as an active monitoring activity when either one of a total number of times a button inside the vehicle is operated within a predetermined first time and a total number of times an anomalous driving behavior is detected within the predetermined first time is greater than or equal to a predetermined number or when an interval at which a drive assist function is activated within the predetermined first time is less than a predetermined value. The drive assist function may be any one of automatic parking assist, auto cruise control, emergency braking, and lane keep assist. The anomalous driving behavior may be where an accelerator position, a brake pressure, or an amount of change in a steering angle within a predetermined time is greater than or equal to a predetermined value. The score calculator may lower the score in response to detecting the active monitoring activity.

This configuration makes it possible to capture an activity where the attacker actively tries to acquire a log of the in-vehicle network in order to obtain a hint for gaining unauthorized control, and this provides an advantage. In other words, the vehicle surveillance device can capture the active monitoring activity based on the score, and thus the security of the in-vehicle network of the vehicle can be further increased.

The suspicious behavior may be detected as an injection activity when either one of an amount of the frame received within a predetermined first time and an amount of a diagnosis command received within the predetermined first time is greater than or equal to a predetermined number, and the score calculator may lower the score in response to detecting the injection activity.

This configuration makes it possible to capture an activity where the attacker attempts to inject a certain frame into the in-vehicle network, and this provides an advantage. In other words, the vehicle surveillance device can capture the injection activity based on the score, and thus the security of the in-vehicle network of the vehicle can be further increased.

The suspicious behavior may be detected as a refinement activity when either one of an amount of an update command received within a predetermined first time and an amount of a frame with an identical attribute received within the predetermined first time is greater than or equal to a predetermined number. The frame with the identical attribute may be a frame that includes an identical identifier, an identical IP address, an identical MAC address, or an identical port number or a frame that includes two or more of an identical identifier, an identical IP address, an identical MAC address, and an identical port number. The score calculator may lower the score in response to detecting the refinement activity.

This configuration makes it possible to capture an attempt where the attacker is undertaking a more sophisticated attack in order to gain unauthorized control of the vehicle, and this provides an advantage. In other words, the vehicle surveillance device can capture the refinement activity based on the score, and thus the security of the in-vehicle network of the vehicle can be further increased.

The vehicle surveillance device may further include a surveillance level changer. In response to the score falling below a predetermined value, the surveillance level changer may execute, based on a value of the score, any one or more of limiting a function of the vehicle, calling for an attention of a driver of the vehicle, sending the score to a nearby vehicle or a server, and enhancing surveillance of the in-vehicle network system.

This configuration makes it possible to conduct intense surveillance of a vehicle that is highly suspected of the reverse engineering activity being performed by the attacker, and this provides an advantage. In addition, with the presence of the surveillance level changer, various responses are taken based on the value of the score. Therefore, this can provide an expected advantage of keeping the attacker from continuing with the reverse engineering if the reverse engineering is being performed.

The suspicious behavior may include a plurality of types of suspicious behaviors indicating respective stages of the reverse engineering, and the score calculator may calculate the score for each of the plurality of types of the suspicious behaviors.

This configuration makes it possible to capture the suspiciousness of the suspicious behavior at each phase of the reverse engineering activity performed by the attacker, and this provides an advantage. In other words, the vehicle surveillance device can capture, based on the plurality of types of scores, the stage (the phase) of an activity performed by the attacker at a stage where the attacker is investigating the in-vehicle network before actually gaining unauthorized control of the vehicle, and thus the security of the in-vehicle network of the vehicle can be increased even further.

The plurality of types of the suspicious behaviors may include at least two selected from a passive monitoring activity, an active monitoring activity, an injection activity, and a refinement activity. The passive monitoring activity may be an action for acquiring the vehicle data. The active monitoring activity may be an operation for attempting to acquire the vehicle data under a specific circumstance or while a specific function of the vehicle is in operation. The injection activity may be an action for attempting to inject a frame into the in-vehicle network system. The refinement activity may be an action for attempting to inject a frame that improves an accuracy of another frame to be injected into the in-vehicle network system.

This configuration makes it possible to capture whether the stage of the reverse engineering activity being performed by the attacker is either one of at least two selected from the passive monitoring activity, the active monitoring activity, the injection activity, and the refinement activity. In other words, the vehicle surveillance device can acquire the stage of the ongoing reverse engineering activity in more detail, and thus the security of the in-vehicle network of the vehicle can be increased even further.

The suspicious behavior may be detected as the passive monitoring activity when any one of a connection of a surveillance device, an error frame, a network interruption, and battery removal is detected. The suspicious behavior may be detected as the active monitoring activity when any one of a total number of times a drive assist function is activated within a predetermined first time, a total number of times a button inside the vehicle is operated within the predetermined first time, and a total number of times an anomalous driving behavior is detected within the predetermined first time is greater than or equal to a predetermined number. The suspicious behavior may be detected as the injection activity when either one of a total number of times the frame is received within the predetermined first time and a total number of times a diagnosis command is received within the predetermined first time is greater than or equal to a predetermined number. The suspicious behavior may be detected as the refinement activity when either one of a total number of times an update command is received within the predetermined first time and a total number of times a frame with an identical attribute is received within the predetermined first time is greater than or equal to a predetermined number.

This configuration makes it possible to acquire the stage of the reverse engineering activity being performed by the attacker without using information dedicated to calculating the score. In other words, the vehicle surveillance device can acquire the stage of the reverse engineering activity being performed by the attacker through a simpler configuration.

The vehicle surveillance device may further include a surveillance level changer, and the surveillance level changer may execute any one or more of limiting a part of a function of the vehicle, calling for an attention of a driver of the vehicle, and sending the score to a nearby vehicle or a server based on the plurality of types of the suspicious behaviors and a value of the score corresponding to each of the plurality of types of the suspicious behaviors.

This configuration enables a response corresponding to the phase of the reverse engineering activity being performed by the attacker, and this provides an advantage in that the security of the in-vehicle network can be improved.

The score calculator may raise the score in response to passing of a predetermined second time or in response to a predetermined first operation being executed on the vehicle. The score calculator may reset the score in response to passing of a predetermined third time or in response to a predetermined second operation being executed on the vehicle.

This configuration allows the score calculator to restore the score. Thus, the score can be corrected automatically in a case where the driver of the vehicle (a normal driver different from the attacker) drives the vehicle in a way that causes the score to drop. Therefore, the vehicle surveillance device can capture more reliably the activity of the attacker in the stage of investigating the in-vehicle network.

A vehicle surveillance method according to one embodiment of the present disclosure is a vehicle surveillance method of conducting surveillance of an in-vehicle network system that includes one or more electronic control units. The vehicle surveillance method includes a receiving step of receiving a frame flowing over the in-vehicle network system; and score calculating step of detecting a suspicious behavior different from a normal driving behavior based on the frame received in the receiving step and vehicle data including information on one or more frames received prior to the frame received in the receiving step and calculating, based on a detection result, a score indicating a likelihood that reverse engineering has been performed on a vehicle provided with the in-vehicle network system.

This method provides advantageous effects similar to those of the vehicle surveillance device described above. For example, the vehicle surveillance method makes it possible to calculate the suspiciousness that the in-vehicle network system is being reverse engineered, which provides an advantage in that a more suspicious vehicle can be grasped.

Hereinafter, an in-vehicle network anomaly detection system according to some embodiments of the present disclosure will be described with reference to the drawings. It is to be noted that the embodiments described below merely illustrate some specific, preferable examples of the present disclosure. In other words, the numerical values, the shapes, the materials, the constituent elements, the arrangements and the connection modes of the constituent elements, the steps, the order of the steps, and so on illustrated according to the following embodiments are examples of the present disclosure and are not intended to limit the present disclosure. The present disclosure is specified based on the claims. Therefore, among the constituent elements according to the following embodiments, any constituent element that is not described in the independent claims expressing the broadest concept of the present disclosure is not necessarily required in order to solve the problem faced by the present disclosure but is construed as a constituent element forming a more preferable embodiment.

Moreover, the drawings are schematic diagrams and do not necessarily provide the exact depictions. In the drawings, configurations that are substantially identical are given identical reference characters, and duplicate descriptions thereof may be omitted or simplified.

Embodiment 1

Hereinafter, a vehicle surveillance device and a vehicle surveillance method in a vehicle provided with an in-vehicle network (an in-vehicle network system) via which a plurality of electronic control units (ECUs) communicate with each other will be described. To be more specific, a technique for in-vehicle network security will be described. According to this technique described below, a score indicating the degree of illegitimacy of a behavior of a vehicle resulting from reverse engineering performed by an attacker is calculated based on frames that flow over an in-vehicle network system, and the function for conducting surveillance of the vehicle is changed in accordance with the calculated score.

[1.1 Overall Configuration of In-Vehicle Network System]

FIG. 1 is a diagram illustrating an overall configuration of an in-vehicle network system according to the present embodiment. As illustrated in FIG. 1, the in-vehicle network system includes ECUs 10, 11, 20, 21, 30, 31, 40, and 41; diagnosis port 50; and gateway 60.

ECU 10 and ECU 11 are connected to bus 1, ECU 20 and ECU 21 are connected to bus 2, ECU 30 and ECU 31 are connected to bus 3, and ECU 40 and ECU 41 are connected to bus 4. Diagnosis port 50 is connected to bus 5. Gateway 60 is connected to each of the buses.

The ECUs are connected to each other via a controller area network (CAN) and transmit and receive frames to and from each other. The buses may be separated into separate domains in accordance with the functions of vehicle 200, for example. For example, powertrain-related ECUs are disposed on bus 1, and bus 1 performs communication concerning control or the like of the engine. In addition, for example, chassis-related ECUs are disposed on bus 2, and bus 2 performs communication for implementing steering control or brake control. In addition, information-related ECUs are disposed on bus 3, and bus 3 performs communication concerning the car navigation system or infotainment. In addition, body-related ECUs are disposed on bus 4, and bus 4 performs communication for controlling the air conditioner, the power window, and so on to be initiated as an occupant presses corresponding buttons.

Gateway 60 receives information on all the buses and performs a process of transferring a received frame to another bus, if necessary. For example, in a case where a frame for a diagnosis is flowing in bus 5, gateway 60 performs a process or the like of transferring this frame to buses 1 to 4. Gateway 60 is an example of the vehicle surveillance device. Gateway 60 performs a process or the like in the in-vehicle network system that includes one or more ECUs.

According to the present embodiment, each bus is implemented by a CAN, but the communication protocol is not limited to the CAN. For example, the communication protocol may be a CAN with flexible data rate (CAN-FD), FlexRay (registered trademark, hereinafter the same), or Ethernet, or the communication protocol may differ for each bus.

[1.2 Configuration of ECU 10]

Figure 2:
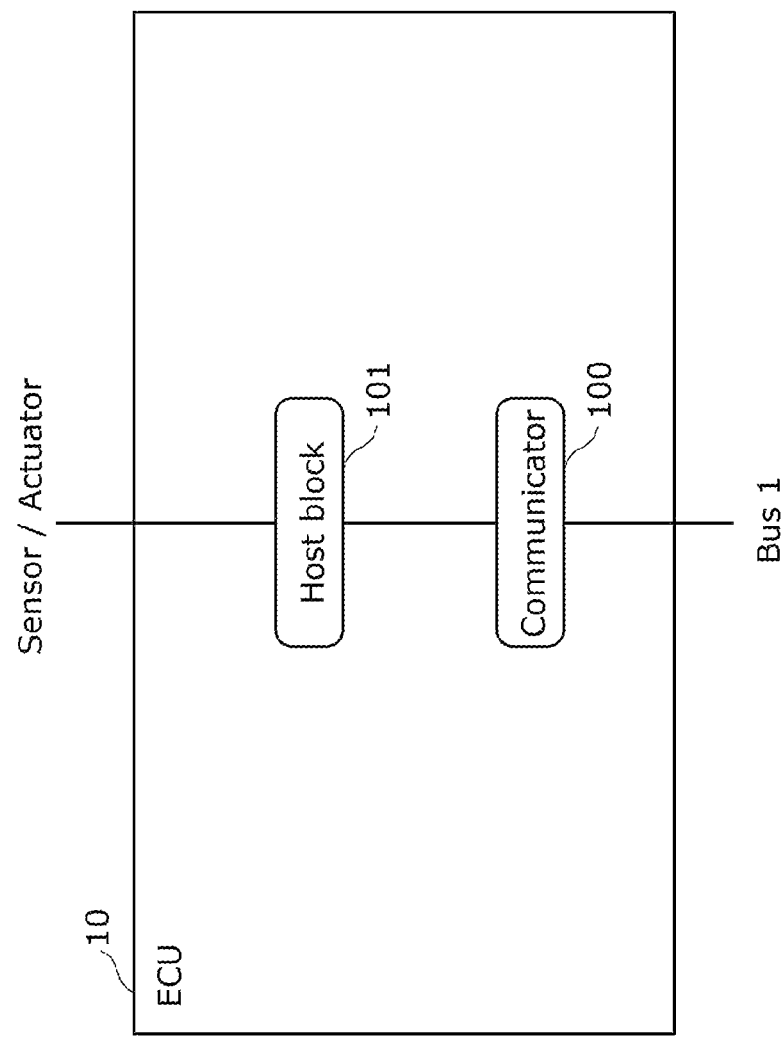
FIG. 2 is a diagram illustrating a configuration of an ECU according to Embodiment 1.

FIG. 2 is a diagram illustrating a configuration of ECU 10 according to the present embodiment. In this example, ECU 11, ECU 20, ECU 21, ECU 30, ECU 31, ECU 40, and ECU 41 each have a configuration similar to the configuration of ECU 10, but they differ in the functions that they can achieve since the sensor or the actuator connected to each of these ECUs differs.

ECU 10 is implemented by a computer that includes, for example but not limited to, a processor, a memory, and a communication interface. As illustrated in FIG. 2, ECU 10 includes communicator 100 and host block 101.

Communicator 100 is connected to bus 1 and transmits a frame that is to flow in bus 1 or receives a frame flowing in bus 1. This can be rephrased as communicator 100 transmits a frame to flow in the in-vehicle network system or receives a frame flowing in the in-vehicle network system. Communicator 100 is implemented by, for example but not limited to, a communication controller or a transceiver.

Host block 101 is a section that performs a main process of ECU 10 and is implemented by a central processing unit (CPU) and a memory. Host block 101 interprets a frame received from communicator 100 and performs a process corresponding to the communication content (the interpretation result). For example, ECU 10 is an ECU that controls the engine. In a case where ECU 10 has received, from another ECU, a frame requesting for an increase in the vehicle speed in the cruise control function, host block 101 of ECU 10 performs control or the like of increasing the engine speed so as to achieve a desired vehicle speed.

Meanwhile, in a case where ECU 10 has received information on the engine speed, host block 101 of ECU 10 performs a process of, for example, transmitting a frame for notifying another ECU.

[1.3 Configuration of Gateway 60]

Figure 3:
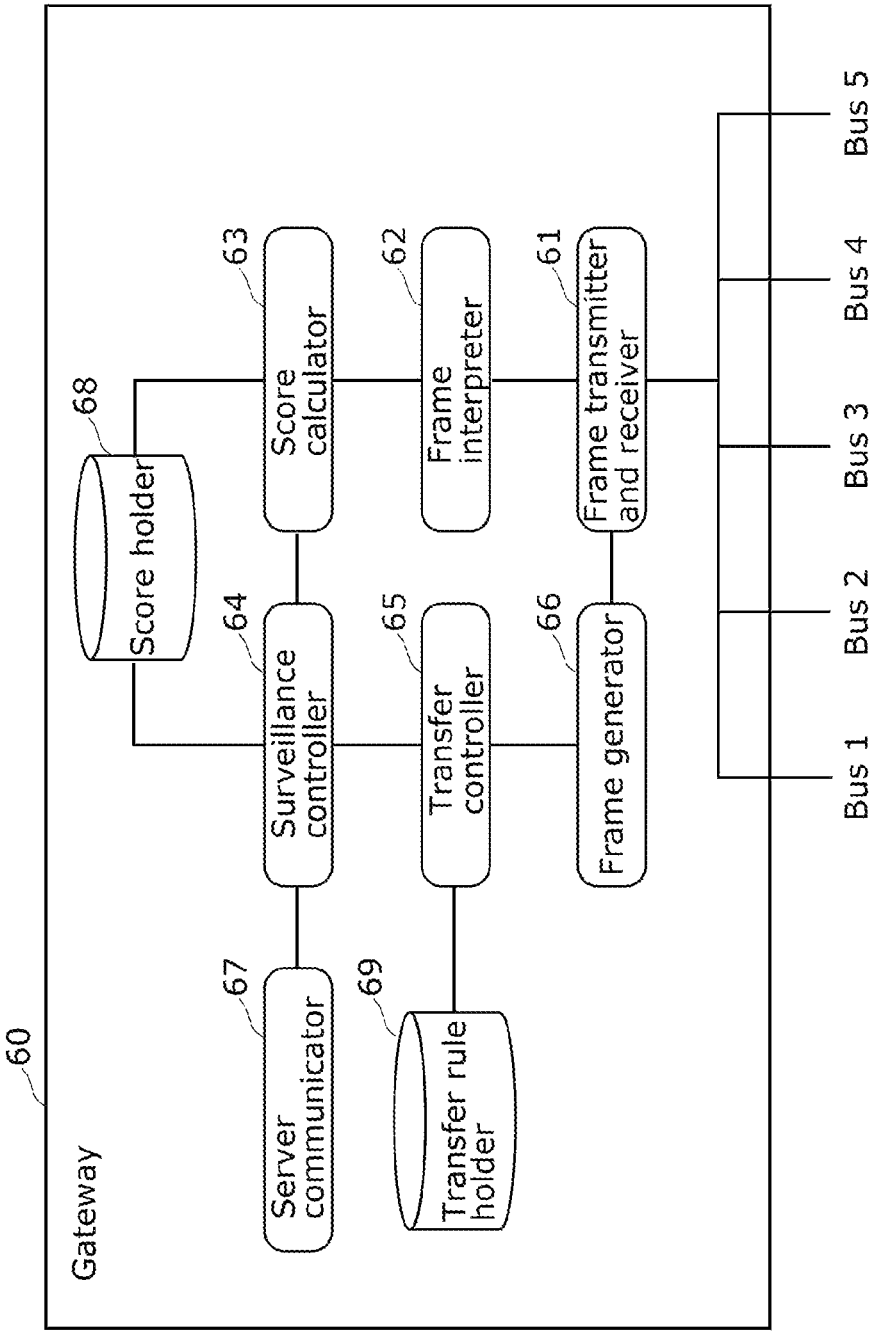
FIG. 3 is a diagram illustrating a configuration of a gateway according to Embodiment 1.

FIG. 3 is a diagram illustrating a configuration of gateway 60 according to the present embodiment. Gateway 60 is implemented by a computer that includes, for example but not limited to, a processor, a memory, and a communication interface.

As illustrated in FIG. 3, gateway 60 includes frame transmitter and receiver 61, frame interpreter 62, score calculator 63, surveillance controller 64, transfer controller 65, frame generator 66, server communicator 67, score holder 68, and transfer rule holder 69.

Frame transmitter and receiver 61 is a communication interface connected to buses 1 to 5 and is implemented by, for example but not limited to, a communication controller or a transceiver. Frame transmitter and receiver 61 transfers a frame received from each bus to frame interpreter 62. In addition, frame transmitter and receiver 61 transmits a frame in accordance with a transmission request from frame generator 66. Frame transmitter and receiver 61 is an example of a frame receiver.

Frame interpreter 62 interprets a frame transferred from frame transmitter and receiver 61 and performs a process corresponding to the frame. In addition, frame interpreter 62 sends a received frame to score calculator 63.

Score calculator 63 calculates the score of vehicle 200 based on a frame sent from frame interpreter 62 and vehicle information (vehicle data) held in score holder 68. Then, score calculator 63 updates the score and the vehicle information of vehicle 200 stored in score holder 68.

Score calculator 63 calculates, as the score, the degree indicating how differently vehicle 200 is used than the way vehicle 200 is normally used. Score calculator 63 calculates the score in order to capture, in particular, a sign indicating that an attacker is acting for the purpose of reverse engineering vehicle 200.

The score is an index that indicates, for example, the likelihood that reverse engineering is being performed (e.g., how likely it is that an attacker is performing reverse engineering). Moreover, the score is an index that can determine the likelihood that reverse engineering is being performed, for example. Furthermore, the score can also be rephrased as an index indicating that vehicle 200 is used in a way that a normal driver would not use vehicle 200 or would be less likely to use vehicle 200, for example. It is to be noted that the reverse engineering as used in the present specification means analyzing an in-vehicle network system. Therefore, the score can also be rephrased as an index that indicates the likelihood that the in-vehicle network system of vehicle 200 is being analyzed or the degree of such an analysis, for example.

According to the present embodiment, score calculator 63 detects a suspicious behavior that is different from a normal driving behavior based on a frame received by frame transmitter and receiver 61 and vehicle data concerning one or more frames received by frame transmitter and receiver 61 before frame transmitter and receiver 61 has received the aforementioned frame. In addition, score calculator 63 calculates, based on the result of detecting the suspicious behavior, the score indicating the likelihood that reverse engineering is being performed on vehicle 200 provided with the in-vehicle network system. This can be rephrased as score calculator 63 updates the score held before the aforementioned frame has been received based on the frame received by frame transmitter and receiver 61 and the vehicle data.

In this manner, score calculator 63 calculates the score based on the time-series data of frames including a frame received by frame transmitter and receiver 61. For example, score calculator 63 calculates the current score based on the frame received most recently and a frame (a frame included in vehicle data) received before the most-recently received frame.

In this example, a normal driving behavior is a driving behavior that is considered to be taken when a driver who is not performing reverse engineering drives vehicle 200. In addition, a driving behavior as used herein includes both a behavior observed in a driving state while vehicle 200 is traveling (e.g., the interval at which the emergency brake is activated indicated in FIG. 4B described later) and a behavior observed in the internal process of vehicle 200 (e.g., the interval at which an error frame occurs indicated in FIG. 4B described later). Moreover, although the following description illustrates some types of suspicious behaviors that lead to the lowering of the score, the suspicious behaviors are not limited to those illustrated below.

For example, a case where the proportion of the time in which vehicle 200 is stopped is large relative to the time in which the ignition is on can be regarded as a sign that some kind of investigation is being performed on stopped vehicle 200, and thus score calculator 63 lowers the score.

In addition, a case where the drive assist function (e.g., any one or more of the emergency brake, the cruise control, the automatic parking assist, and so on) of vehicle 200 is used repeatedly within a short period of time of several seconds to several minutes also indicates the likelihood that an attacker is acquiring the log of the in-vehicle network to analyze a frame that allows for unauthorized control, and thus score calculator 63 lowers the score. The drive assist function may include a lane keep assist function (a lane departure prevention assist function).

In addition, a case where an extreme driving condition (e.g., sudden acceleration, sudden braking, sudden steering, or the like) of vehicle 200 is observed at a short interval or a case where a button installed inside the vehicle to control a body-related function, such as the air conditioner or the light, is pressed repeatedly also indicates the likelihood that an attacker is acquiring the log to analyze the in-vehicle network, and thus score calculator 63 lowers the score.

In addition, a case where an error frame occurs in the in-vehicle network at a short interval also indicates the likelihood that an influence of an unauthorized device connected by an attacker is being observed, and thus score calculator 63 lowers the score.

In addition, a case where frames in the in-vehicle network are interrupted for a predetermined period (e.g., several seconds or so) also indicates the likelihood that an attacker is working to connect a device for logging the in-vehicle network or a device for injecting an unauthorized frame, and thus score calculator 63 lowers the score.

In addition, a case where a predetermined amount or more of diagnosis commands are flowing over the in-vehicle network indicates the likelihood that an attacker is repeatedly investigating an influence of injecting a diagnosis command into vehicle 200 or is repeatedly trying to delete a malfunction code that has arisen due to an influence of an attack attempt, and thus score calculator 63 lowers the score.

Aside from the above, score calculator 63 may lower the score in accordance with, for example but not limited to, the number of frames for performing an update, the frequency at which the voltage of the battery drops or the battery is removed, or the number of packets that include an IP address or a port number that is not normally observed.

The conditions based on which the score is lowered as described above are not necessarily related to activities performed by an attacker. Therefore, score calculator 63 may store the calculated score into a non-volatile memory and raise the score at an increment of a predetermined value (e.g., one) as a predetermined time (an example of a predetermined second time) passes (e.g., every other day). Score calculator 63 may detect properly vehicle 200 in which an activity that leads to the lowering of the score is observed repeatedly by performing also a process of restoring the score. In this example, score calculator 63 may raise the score at an increment of a predetermined value each time a predetermined operation (an example of a predetermined first operation) is executed on vehicle 200. The predetermined first operation may be, for example, an operation of turning on the ignition or may be any other operation.

Score calculator 63 sends a received frame to surveillance controller 64.

Surveillance controller 64 determines a process to be performed on a received frame based on the score held in score holder 68. For example, surveillance controller 64 changes a surveillance level indicating the level of surveillance to be conducted against reverse engineering, based on the score. Surveillance controller 64 is an example of a surveillance level changer.

In a case where the score is greater than a predetermined threshold value, surveillance controller 64 refrains from doing anything in particular on a received frame, and surveillance controller 64 sends the received frame to transfer controller 65.

In a case where the score is less than or equal to the predetermined threshold value, surveillance controller 64, for example, discards the received frame or sends a degrade mode notification frame to transfer controller 65 in order to enter a degrade mode. The degrade mode notification frame is a notification indicating that a frame is transmitted to notify another ECU of entering the degrade mode. In addition, in order to notify server communicator 67 that the score has been lowered, surveillance controller 64 sends a vehicle log (vehicle data) and the score to server communicator 67. In this example, the vehicle log may include information on the frames observed in the in-vehicle network.

Transfer controller 65 sends the received frame to frame generator 66 so that the received frame is transferred in accordance with a transfer rule stored in transfer rule holder 69.

Frame generator 66 requests frame transmitter and receiver 61 to transmit the frame received from transfer controller 65.

Server communicator 67 notifies a server of the content received from surveillance controller 64, receives a notification from the server, and notifies surveillance controller 64 of the content.

Score holder 68 stores the score of vehicle 200 and data for calculating the score. The details of the information stored in score holder 68 will be described later with reference to FIG. 4A and FIG. 4B.

Transfer rule holder 69 stores the rule to be used to transfer frames. The details of the transfer rule will be described later with reference to FIG. 5.

In this example, a part or the whole of the constituent elements of gateway 60 may be included in a device (e.g., a server device) external to vehicle 200. In this case, vehicle 200 transmits a received frame and vehicle data to the external device. The external device calculates the score based on the frame and the vehicle data received from vehicle 200 and transmits the calculated score to vehicle 200.

[1.4 Examples of Score and Vehicle Data Stored in Score Holder 68]

FIG. 4A is a diagram illustrating an example of the score according to the present embodiment. FIG. 4B is a diagram illustrating an example of the vehicle data according to the present embodiment. The score and the vehicle data are stored in score holder 68. The vehicle data may be used to calculate the score. The criteria shown in FIG. 4B are criteria based on which a given behavior can be determined to be a suspicious behavior.

FIG. 4A indicates that the score is 80. The score takes a value from 0 to 100, and the initial value of the score is 100. In other words, FIG. 4A shows an example in which the score, whose initial value is 100, has been lowered to 80 as suspicious behaviors have been detected. The value, 80, indicated in FIG. 4A shows the current score, for example.

Meanwhile, in the vehicle data shown in FIG. 4B, the present values and the previous values are stored as the data observed after the ignition has been turned on. Under the previous values, data observed from when the ignition was turned on last time to when the ignition was turned off last time is stored. As the vehicle data, the following pieces of information are stored: the stopped time proportion indicating the proportion at which the speed of vehicle 200 is at 0 km/h; the interval at which the emergency brake is activated, which indicates an interval between when the emergency brake is turned on to when the emergency brake is turned on the next time; the interval at which the cruise control is activated; the interval at which the automatic parking assist is activated; the interval at which sudden acceleration is detected, which indicates an interval at which frames indicating that the accelerator position is at 100% are received; the interval at which sudden braking is detected; the interval at which sudden steering is detected; the interval at which an error frame occurs, which indicates an interval at which an error frame is received; the message interruption time; the presence of a battery voltage drop or the presence of battery removal, the number of times a diagnosis command is received; the number of times an update command is received; the successive button pressing count, which indicates the number of times a button provided inside the vehicle for controlling the air conditioner or the light is pressed within a unit time (e.g., one minute); and the presence of a third party device connection. The expression "the interval at which a function is activated" means the time interval between two instances of activation, and the expression "the interval at which a phenomenon is detected" means the time interval between two instances of detection. A third party device is an example of a surveillance device. The number of times a command is received in the above is an example of an amount of the received command, and the successive button pressing count is an example of the number of times a button is operated. The amount of the received command is not limited to the number of times a given command is received and may instead be the data amount. For example, FIG. 4B may include the data amount of the diagnosis command (the total amount of data received in a predetermined first time) in place of the number of times the diagnosis command is received.

The stored vehicle data shown in FIG. 4B indicates that the stopped time proportion is 70% this time and was 50% last time. In addition, the interval at which the emergency brake is activated is 60 seconds this time and was "-" last time. This means that the emergency brake has not been activated twice or more at this time. In addition, the interval at which the cruise control is activated is "-" this time, and this means that the cruise control has not been activated twice or more at this time. Meanwhile, the cruise control was activated at an interval of 1000 seconds last time. In addition, the interval at which the automatic parking assist is activated is 30 seconds this time and was "-" last time. This means that the automatic parking assist has not been activated twice or more.

The interval at which sudden acceleration is detected is "-" this time and was also "-" last time, and this means that sudden acceleration has not been detected twice or more. In a similar manner, the interval at which sudden braking is detected and the interval at which sudden steering is detected are both "-" this time and was both "-" last time, and this means that neither the frame for sudden braking nor the frame for sudden steering has been received twice or more. Herein, the sudden acceleration, the sudden braking, and the sudden steering are each an example of an anomalous driving behavior.

The interval at which an error frame occurs is one second this time and was "-" last time. This means that an error frame is received at an interval of one second this time, but an error frame was not received twice of more last time. In addition, the message interruption time is three seconds this time and was 0 seconds last time (i.e., less than one second).

The presence of a battery voltage drop indicates that a battery voltage drop is detected this time, but a battery voltage drop was not detected last time. The number of times a diagnosis command is received and the number of times an update command is received are each 0 this time as well as last time.

The successive button pressing count indicates that the button is pressed thirty times this time and was pressed three times last time.

The presence of a third party device connection indicates that a third party device is connected this time but no third party device was connected last time.

The criteria related to the time intervals shown in FIG. 4B (e.g., the interval at which the emergency brake is activated, the interval at which sudden acceleration is detected, and so on) may be the number of times of the activation or the number of times of the detection within the predetermined first time. In addition, the criteria related to the number of times shown in FIG. 4B (e.g., the number of times a diagnosis command is received, the number of times an update command is received, the successive button pressing count, and so on) may be the time interval that is based on the time the command was received last time or the time the button was pressed last time and the time the command is received this time or the time the button is pressed this time. It suffices that score calculator 63 calculate the score by use of any one of the time intervals or the number of times under the criteria shown in FIG. 4B. The vehicle data includes, for example, information on frames for the criteria observed in the in-vehicle network. The vehicle data includes, for example but not limited to, the time information indicating the time at which a frame is received or the information indicating the amount of a received frame. This can be rephrased as the vehicle data includes, for example, information on one or more frames received by frame transmitter and receiver 61 prior to this time (previously). The vehicle data shown in FIG. 4B is an example of log information. The vehicle data is also referred to as a vehicle log or vehicle information.

According to the present embodiment, the score and the vehicle data are stored in plaintext. Alternatively, the score and the vehicle data may be stored in the form of encrypted data.

[1.5 Example of Transfer Rule Stored in Transfer Rule Holder]

FIG. 5 illustrates an example of the transfer rule according to the present embodiment. Transfer rule holder 69 stores a table (the transfer rule) holding the origin of the transfer and the destination of the transfer for each frame ID, as shown in FIG. 5.

FIG. 5 indicates that the transfer of the frame with the ID 0x100 originates from bus 1, and this frame is transferred to buses 2, 3, and 4. In a similar manner, the transfer of the frame with the ID 0x200 originates from bus 2, and this frame is transferred to bus 3, the transfer of the frame with the ID 0x250 originates from bus 2, and this frame is transferred to bus 4, and the transfer of the frame with the ID 0x300 originates from bus 3, and this frame is transferred to bus 1.

[1.6 Flowchart Illustrating Process of Gateway 60]

Figure 6:
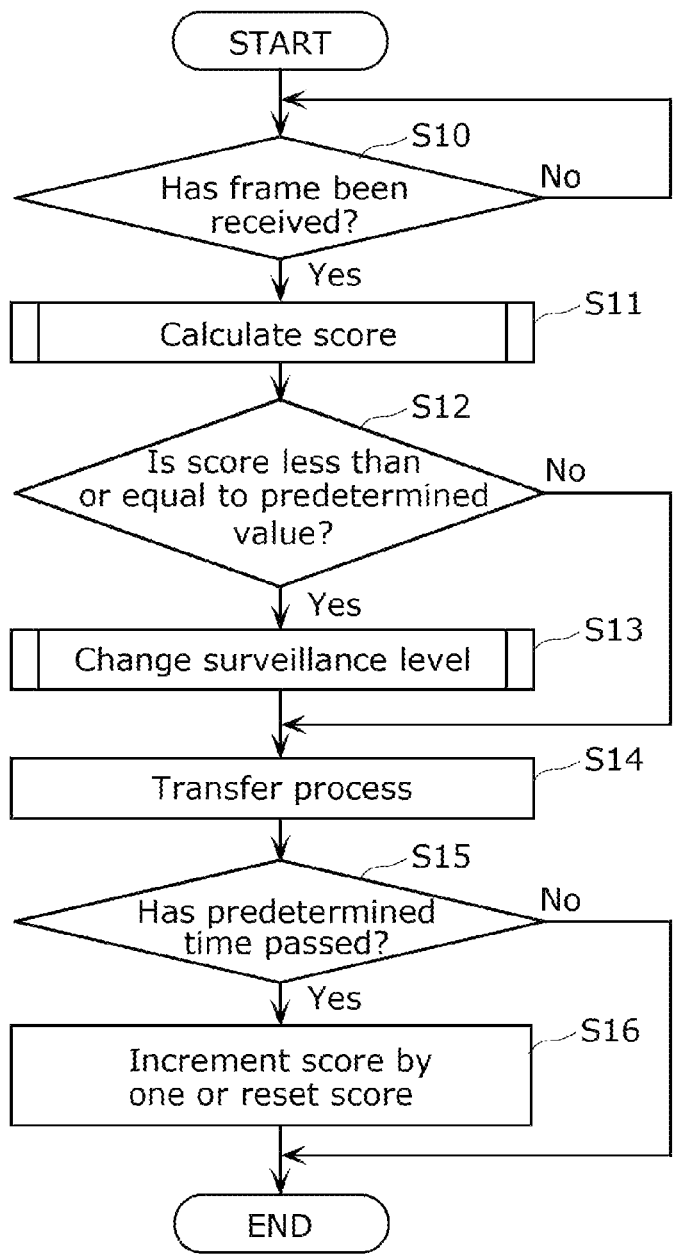
FIG. 6 is a flowchart illustrating a process of the gateway according to Embodiment 1.

FIG. 6 is a flowchart illustrating a process of gateway 60 according to the present embodiment.

As illustrated in FIG. 6, gateway 60 determines whether gateway 60 has received a frame (S10).

If gateway 60 has received a frame (Yes at S10), gateway 60 calculates the score (S11). If gateway 60 has not received any frame (No at S10), gateway 60 stands by until gateway 60 receives a frame.

After calculating the score, gateway 60 checks whether the calculated score is less than or equal to a predetermined value (S12). Surveillance controller 64 determines whether the score calculated by score calculator 63 is less than or equal to the predetermined value.

If the score is less than or equal to the predetermined value (Yes at S12), gateway 60 changes the surveillance level (S13) and executes a transfer process (S14).

If the score is greater than the predetermined value (No at S12), gateway 60 executes the transfer process (S14) without changing the surveillance level.

Next, score calculator 63 of gateway 60 determines whether a predetermined time has passed (S15). The predetermined time is, for example, the time that has passed since the determination was Yes at step S15 the previous time, but this is not a limiting example. The predetermined time may be the time that has passed since the score was reset or the driving time since the score was reset.

If the predetermined time has passed (Yes at S15), score calculator 63 increments the score by one or resets the score (S16) and terminates the process. In a case where score calculator 63 increments the score by one, score calculator 63 increments the current score by one and then stores the resulting score into score holder 68. Meanwhile, in a case where score calculator 63 resets the score, score calculator 63 stores the initial value (e.g., 100) of the score into score holder 68 regardless of the current score.

Meanwhile, if the predetermined time has not passed (No at S15), score calculator 63 terminates the process without changing the score.

In this example, the determination at step S15 is not limited to the determination made based on the predetermined time but may instead be made as a predetermined operation is executed on vehicle 200. The predetermined operation may be, for example, an operation (e.g., an operation on a button) indicating that the process at step S16 is to be executed or an operation of turning on or off the ignition. The operation of incrementing the score is an example of the predetermined first operation, and the operation of resetting the score is an example of a predetermined second operation.

In this example, the score may be reset after the score has been incremented a plurality of times. In other words, the time in which the score is reset (an example of a predetermined third time) may be greater than the time in which the score is incremented (an example of the predetermined second time).

[1.7 Flowchart of How Gateway 60 Calculates Score]

Figure 7:
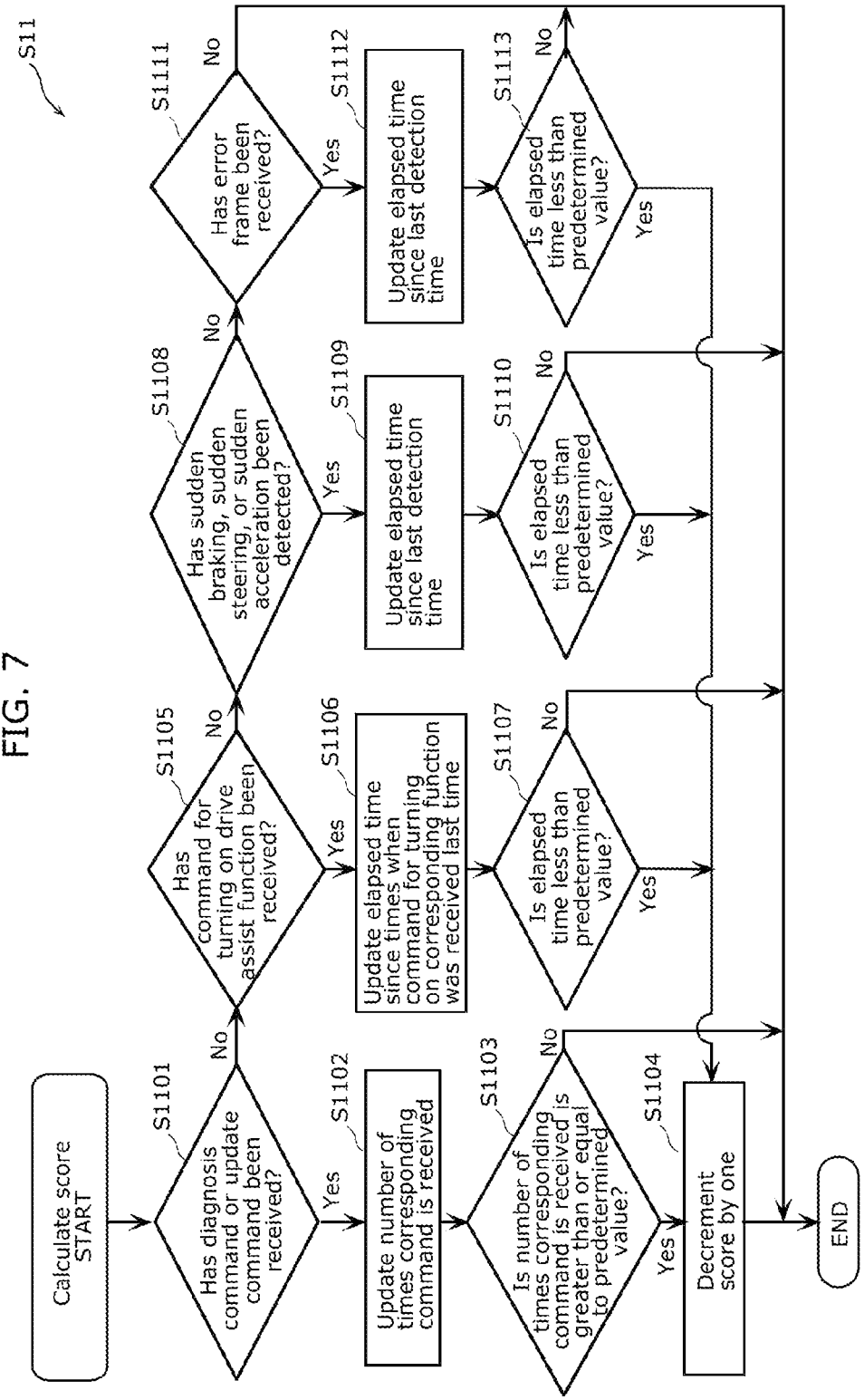
FIG. 7 is a flowchart illustrating how the gateway calculates the score according to Embodiment 1.

FIG. 7 is a flowchart illustrating how gateway 60 calculates the score according to the present embodiment. Specifically, FIG. 7 is a flowchart illustrating the details of the process of calculating the score at step S11 of FIG. 6. In the example described with reference to FIG. 7, the criteria based on which a given behavior is determined to be a suspicious behavior are the number of times a diagnosis command or an update command is received, the interval at which a command for turning on the drive assist function is received (e.g., the interval at which the emergency brake is activated), and the interval at which sudden braking, sudden steering, or sudden acceleration is detected.

As illustrated in FIG. 7, gateway 60 checks whether the received frame is for a diagnosis command or for an update command (S1101). Score calculator 63 determines whether the received frame is for the diagnosis command or for the update command.

If the received frame is for the diagnosis command or for the update command (Yes at S1101), score calculator 63 updates the number of times the corresponding command has been received (S1102). For example, score calculator 63 increments the number of times the corresponding command has been received that is stored in score holder 68 by one.

Next, gateway 60 determines whether the number of times the corresponding command has been received is greater than or equal to a predetermined value (e.g., greater than or equal to 100) (S1103). For example, score calculator 63 determines whether the updated number of times the corresponding command has been received is greater than or equal to the predetermined value. The predetermined value used in the determination at step S1103 is stored in advance in score holder 68.

If the number of times the corresponding command has been received within the predetermined first time is greater than or equal to the predetermined value (Yes at S1103), gateway 60 decrements the score by one (S1104) and terminates the process. Meanwhile, if the number of times the corresponding command has been received within the predetermined first time is less than the predetermined value (No at S1103), gateway 60 terminates the process. In other words, score calculator 63 updates the score if the number of times the corresponding command has been received is greater than or equal to the predetermined value and refrains from updating the score if the number of times the corresponding command has been received is less than the predetermined value. In this example, the predetermined first time may be the time used in the determination at step S15 or the time dedicated for use in the determination process illustrated in FIG. 7, for example. The predetermined first time may be stored in advance in score holder 68, for example. This applies in a similar manner to the predetermined first time used in other parts of the description related to FIG. 7.

In this manner, score calculator 63 lowers the score if, as a suspicious behavior, either one of the number of times a diagnosis command has been received and the number of times an update command has been received within the predetermined first time is greater than or equal to the predetermined value.

In addition, the above can be rephrased as score calculator 63 detects the suspicious behavior as an injection activity if the number of times a diagnosis command has been received within the predetermined first time is greater than or equal to a predetermined number and lowers the score in response to detecting the injection activity. In this example, the suspicious behavior may be detected as an injection activity based not on the number of times a diagnosis command is received but instead on the number of times a frame is received within the predetermined first time, for example.

In addition, score calculator 63 may detect the suspicious behavior as a refinement activity if the number of times an update command has been received within the predetermined first time is greater than or equal to a predetermined number and lower the score in response to detecting the refinement activity. The suspicious behavior may be detected as a refinement activity based not on the fact that the number of times an update command is received is greater than or equal to the predetermined number but instead on the fact that the number of times a frame with an identical attribute is received within the predetermined first time is greater than or equal to a predetermine number, for example.

The frame with an identical attribute means a frame that includes an identical identifier, an identical IP address, an identical MAC address, or an identical port number or a frame that includes an identical combination of two or more of the identifier, the IP address, the MAC address, and the port number. The attribute is information for identifying a frame, and examples of the attribute include the identifier, the IP address, the MAC address, and the port number included in a frame.

If the received frame is neither for a diagnosis command nor for an update command at step S1101 (No at S1101), gateway 60 checks whether the received frame is for a command for turning on the drive assist function (S1105). This can be rephrased as score calculator 63 proceeds to step S1105 if the suspicious behavior is detected neither as an injection activity nor as a refinement activity.

Next, if the received frame is for a command for turning on the drive assist function (Yes at S1105), gateway 60 updates the elapsed time since the time at which the corresponding function was turned on last time (e.g., the time at which the command for turning on the corresponding function was received) (S1106). Score calculator 63 acquires, from score holder 68, the time at which the frame for the command for turning on the drive assist function was received last time and updates the elapsed time based on the acquired time and the time at which the frame for which the determination of Yes was made at step S1105 was received. For example, score calculator 63 uses the elapsed time obtained as the time difference between the two times.

Next, gateway 60 checks whether the updated elapsed time is less than a predetermined value (e.g., less than five minutes) (S1107). Score calculator 63 determines whether the updated elapsed time is less than the predetermined value. The predetermined value used in the determination at step S1107 is stored in advance in score holder 68.

If the elapsed time within the predetermined first time is less than the predetermined value (Yes at S1107), gateway 60 decrements the score by one (S1104) and terminates the process.

If the elapsed time within the predetermined first time is greater than or equal to the predetermined value (No at S1107), gateway 60 terminates the process without any further operation in particular. In other words, score calculator 63 updates the score if the elapsed time is less than the predetermined value or refrains from updating the score if the elapsed time is greater than or equal to the predetermined value.

In this manner, score calculator 63 lowers the score if, as a suspicious behavior, the interval at which the drive assist function has been activated within the predetermined first time is less than a predetermined value. In this example, score calculator 63 may make the determination of Yes at S1107 if the number of times the drive assist function is activated within the predetermined first time is greater than or equal to a predetermined number. The number of times the drive assist function is activated may be the number of times the drive assist function has been activated or the number of times the command for turning on the drive assist function has been received.

In addition, score calculator 63 may detect the suspicious behavior as an active monitoring activity if the above-described elapsed time within the predetermined first time is less than a predetermined value or if the number of times the drive assist function is activated within the predetermined first time is greater than or equal to a predetermined number and may lower the score in response to detecting the active monitoring activity. The suspicious behavior may be detected as an active monitoring activity based not on the drive assist function but instead on the fact that the number of times a button inside the vehicle is operated (e.g., the successive button pressing count indicated in FIG. 4B) within the predetermined first time is greater than or equal to a predetermined number of times, for example.

If the received frame is not for the command for turning on the drive assist function at step S1105 (No at S1105), gateway 60 checks whether any one of sudden braking, sudden steering, and sudden acceleration is detected from the received frame (S1108). Score calculator 63 determines whether the received frame is for any one of sudden braking, sudden steering, and sudden acceleration.

If any one of sudden braking, sudden steering, and sudden acceleration has been detected (Yes at S1108), gateway 60 updates the elapsed time since the previous detection time (S1109). Score calculator 63 acquires, from score holder 68, the time at which a frame for any one of sudden braking, sudden steering, and sudden acceleration was received last time and updates the elapsed time based on the acquired time and the time at which the frame for which the determination of Yes was made at step S1108 was received. For example, score calculator 63 uses the elapsed time obtained as the time difference between the two times. The elapsed time is an example of a detection interval.

Gateway 60 checks whether the elapsed time is less than a predetermined value (e.g., less than five minutes) (S1110). Score calculator 63 determines whether the updated elapsed time is less than the predetermined value. The predetermined value used in the determination at step S1110 is stored in advance in score holder 68.

If the elapsed time within the predetermined first time is less than the predetermined value (Yes at S1110), gateway 60 decrements the score by one (S1104) and terminates the process.

If the elapsed time within the predetermined first time is greater than or equal to the predetermined value (No at S1110), gateway 60 terminates the process without any further operation in particular. In other words, score calculator 63 updates the score if the elapsed time is less than the predetermined value or refrains from updating the score if the elapsed time is greater than or equal to the predetermined value.

In this manner, the above can be rephrased as score calculator 63 lowers the score if, as a suspicious behavior, the elapsed time for any one of sudden braking, sudden steering, and sudden acceleration (an example of an anomalous driving behavior) within the predetermined first time is less than the predetermined value.

In addition, the above can be rephrased as score calculator 63 detects the suspicious behavior as an active monitoring activity if the elapsed time for any one of sudden braking, sudden steering, and sudden acceleration within the predetermined first time is less than the predetermined value and lowers the score in response to detecting the active monitoring activity.

In this example, the suspicious behavior may be indicated by the fact that the number of times an anomalous driving behavior is detected within the predetermined first time is greater than or equal to a predetermined value. An anomalous driving behavior may be detected based on the fact that the accelerator position, the brake pressure, or the amount of change in the steering angle within a predetermined time is greater than or equal to a predetermined value.

If none of sudden braking, sudden steering, and sudden acceleration is detected from the received frame at step S1108 (No at S1108), gateway 60 checks whether the received frame is an error frame (S1111). Score calculator 63 determines whether the received frame is an error frame.

If the received frame is not an error frame (No at S1111), gateway 60 terminates the process without any further operation.

Meanwhile, if the received frame is an error frame (Yes at S1111), gateway 60 updates the elapsed time since the previous detection time (S1112). Score calculator 63 acquires, from score holder 68, the time at which an error frame was received last time and updates the elapsed time based on the acquired time and the time at which the frame for which the determination of Yes was made at step S1111 was received. For example, score calculator 63 uses the elapsed time obtained as the time difference between the two times. The elapsed time is an example of an occurrence interval.

Gateway 60 checks whether the elapsed time is less than a predetermined value (e.g., less than five minutes) (S1113). Score calculator 63 determines whether the updated elapsed time is less than the predetermined value. The predetermined value used in the determination at step S1113 is stored in advance in score holder 68.

If the elapsed time within the predetermined first time is less than the predetermined value (Yes at S1113), gateway 60 decrements the score by one (S1104) and terminates the process.

If the elapsed time within the predetermined first time is greater than or equal to the predetermined value (No at S1113), gateway 60 terminates the process without any further operation. In other words, score calculator 63 updates the score if the elapsed time is less than the predetermined value or refrains from updating the score if the elapsed time is greater than or equal to the predetermined value.

In this manner, score calculator 63 lowers the score if, as a suspicious behavior, the elapsed time for an error frame within the predetermined first time is less than the predetermined value.

In addition, the above can be rephrased as score calculator 63 detects the suspicious behavior as a passive monitoring activity if the elapsed time for an error frame within the predetermined first time is greater than or equal to the predetermined value and lowers the score in response to detecting the passive monitoring activity. In this example, the suspicious behavior may be detected as a passive monitoring activity based on the fact that an error frame has been detected. In addition, the suspicious behavior may be detected as a passive monitoring activity based on the fact that any one of the connection of a third party device (an example of a surveillance device), the network interruption (e.g., an interruption of a message), and a voltage drop or removal of the battery has been detected or the fact that the elapsed time for any of the above is less than a predetermined value. In addition, the suspicious behavior may be detected as a passive monitoring activity based on the fact that the stopped time proportion (e.g., the proportion of time in which the vehicle is stopped relative to the predetermined first time) is greater than or equal to a predetermined proportion.

In this example, it suffices that score calculator 63 make at least one of the determinations at steps S1101, S1105, S1108, and S1111 shown in FIG. 7. For example, it suffices that score calculator 63 can detect, as a suspicious behavior, at least one of a passive monitoring activity, an active monitoring activity, an injection activity, or a refinement activity.

[1.8 Flowchart of How Gateway 60 Changes Surveillance Level]

Figure 8:
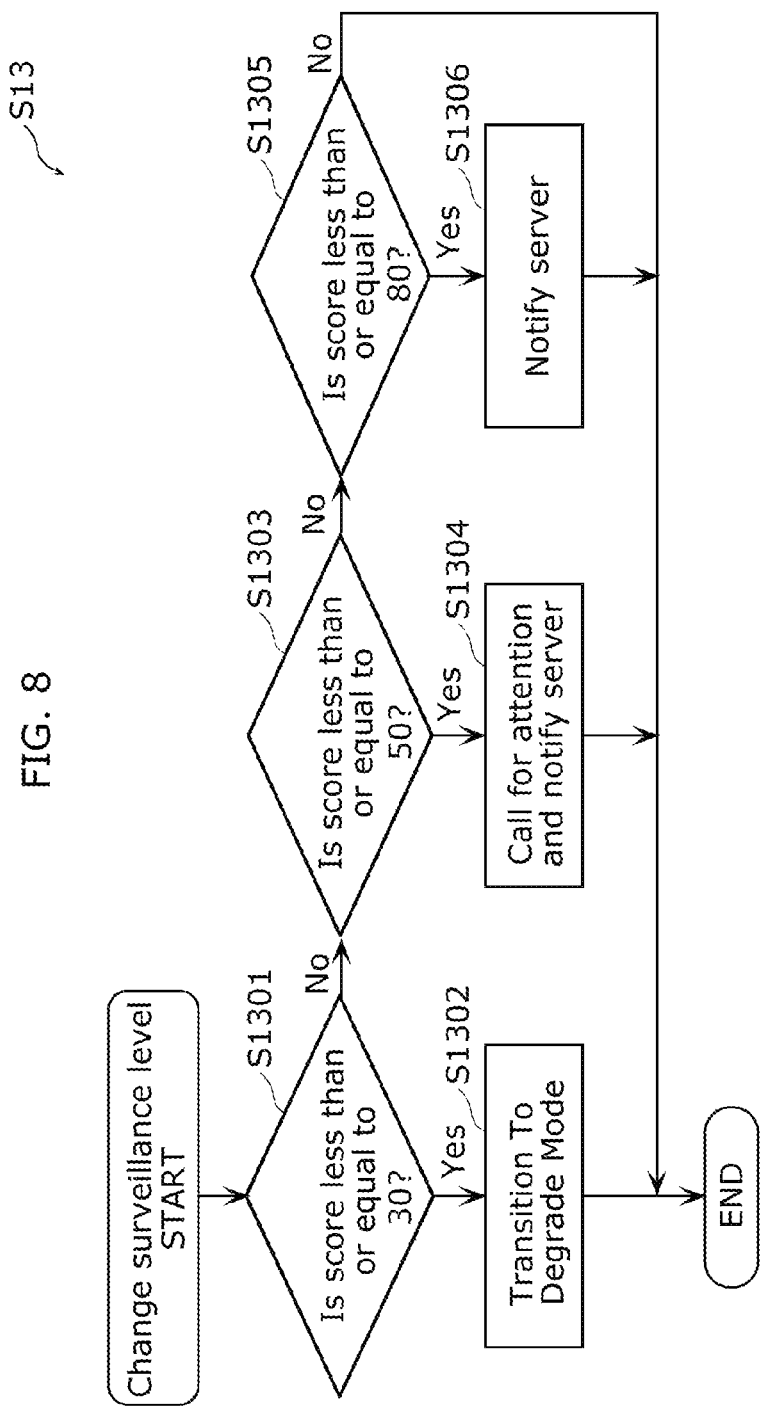
FIG. 8 is a flowchart illustrating how the gateway changes the surveillance level according to Embodiment 1.

FIG. 8 is a flowchart illustrating how gateway 60 changes the surveillance level according to the present embodiment. Specifically, FIG. 8 is a flowchart illustrating the details of the process of changing the surveillance level at step S13 of FIG. 6. The operation illustrated in FIG. 8 is executed by surveillance controller 64, for example.

As illustrated in FIG. 8, if the score is less than or equal to the predetermined value at step S12 (Yes at S12), gateway 60 determines whether the score is less than or equal to 30 (S1301). For example, surveillance controller 64 determines whether the score calculated at step S11 is less than or equal to the predetermined value. The predetermined value used in the determination at step S1301 is stored in advance in score holder 68. The score of 30 is an example of a first threshold value.

If the score is less than or equal to 30 (Yes at S1301), gateway 60 transitions to a degrade mode (S1302). The degrade mode is a mode in which a part or the whole of the drive assist function is disabled. In order to perform the process of transitioning to the degrade mode, gateway 60, for example, notifies another ECU of the transition, displays a notification informing the driver that the function has been disabled (calls for the driver's attention), or keeps some of the frames from being transferred at gateway 60. Thereafter, gateway 60 terminates the process. In this example, the transition to the degrade mode is an example of limiting the functions of vehicle 200. In addition, gateway 60 may notify a nearby vehicle or a server of the current score.

In a case where an intrusion detection system is included in the in-vehicle network system, the transition to the degrade mode may be equated to enabling the intrusion detection system. Enabling the intrusion detection system is an example of enhancing the surveillance of the in-vehicle network.

If the score is less than or equal to 30, if suffices that gateway 60 execute one or more of limiting the functions of vehicle 200, calling for the attention of the driver of vehicle 200, notifying a nearby vehicle or a server of the score, and enhancing the surveillance of the in-vehicle network.

If the score is greater than 30 (No at S1301), gateway 60 determines whether the score is less than or equal to 50 (S1303). This can be rephrased as surveillance controller 64 determines whether the score is greater than 30 but less than or equal to 50 at step S1303. The score of 50 is an example of a second threshold value.

If the score is less than or equal to 50 (Yes at S1303), gateway 60 transmits a frame for calling for the driver's attention to an ECU that controls the display in an instrument cluster or the like, for example, to call for the driver's attention and notifies a server of the score or a vehicle log (S1304). Then, gateway 60 terminates the process. It suffices that either one of calling for the driver's attention and notifying the server be performed at step S1304. In addition, gateway 60 may notify a nearby vehicle of the score at step S1304.

If the score is greater than 50 (No at S1303), gateway 60 checks whether the score is less than or equal to 80 (S1305). This can be rephrased as surveillance controller 64 determines whether the score is greater than 50 but less than or equal to 80 at step S1305. The score of 80 is an example of a third threshold value.

If the score is less than or equal to 80 (Yes at S1305), gateway 60 notifies the server of the score (S1306).

If the score is greater than 80 (No at S1305), gateway 60 terminates the process without any further operation. In this example, if the determination is No at step S1305, gateway 60 may also notify the server.

In this manner, in a case where the score has fallen below a predetermined value, surveillance controller 64 executes, based on the value of the score, any one or more of limiting the functions of vehicle 200, calling for the attention of the driver of vehicle 200, notifying a nearby vehicle or a server of the score, and enhancing the surveillance of the in-vehicle network. For example, in response to the score falling, surveillance controller 64 executes any one or more of the above in order to raise the surveillance level. Surveillance controller 64 executes an operation corresponding to a first surveillance level if the score is less than or equal to the first threshold value, executes an operation corresponding to a second surveillance level that is lower than the surveillance level of the first surveillance level if the score is greater than the first threshold value but less than or equal to the second threshold value that is greater than the first threshold value, or executes an operation corresponding to a third surveillance level that is lower than the surveillance level of the second surveillance level if the score is greater than the second threshold value but less than or equal to the third threshold value that is greater than the second threshold value. The first threshold value is, for example, a value that is greater than a minimum value (e.g., 0) of the score, and the third threshold value is, for example, a value that is less than the initial value (e.g., 100) of the score. In this example, the first threshold value, the second threshold value, the third threshold value, and the operations corresponding to the first surveillance level, the second surveillance level, and the third surveillance level are stored in advance in score holder 68.

[1.9 Operation Sequence of Gateway (Case where Score Becomes Less than or Equal to 50)]

FIG. 9 is a diagram illustrating a sequence of operations performed by gateway 60 according to the present embodiment. Specifically, FIG. 9 is a diagram illustrating the sequence of operations performed in response to the score of 51 in gateway 60 having fallen to or below 50 due to a suspicious driving behavior. In the following example, ECU 20 is an ECU that transmits a frame requesting emergency braking, and ECU 30 is an ECU that controls the display.

As illustrated in FIG. 9, ECU 20 transmits a frame requesting the emergency brake to be turned on (S100), and gateway 60 receives the transmitted frame requesting the emergency brake to be turned on. In this example, an ECU that controls the brake also receives the transmitted frame requesting the emergency brake to be turned on and activates the emergency brake, but this is omitted from FIG. 9.

Next, after having transmitted the frame requesting the emergency brake to be turned on, ECU 20 transmits a frame requesting the emergency brake to be turned off (S101), and gateway 60 receives the transmitted frame requesting the emergency brake to be turned off.

Thereafter, ECU 20 transmits again a frame requesting the emergency brake to be turned on (S102), and gateway 60 receives the transmitted frame requesting the emergency brake to be turned on.

Gateway 60 lowers the score by one if the time (an example of the detection interval) from when gateway 60 has received the frame requesting the emergency brake to be turned on at step S100 to when gateway 60 has received the frame requesting the emergency brake to be turned on at step S102 is less than a predetermined value (e.g., five minutes) (S103). The process at step S103 corresponds to the process at step S1104 executed after the determination of Yes has been obtained at step S1107 of FIG. 7.

When the score is lowered by one, the current score becomes 50. Therefore, gateway 60 transmits a frame for providing a display that calls for the driver's attention (S104). The process at step S104 corresponds to the process at step S1304 of FIG. 8.

Figure 11A:
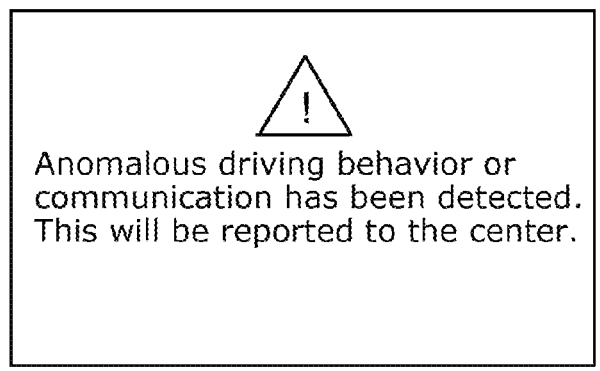
FIG. 11A is a diagram illustrating an example of the display content that a driver is to be notified of according to Embodiment 1.

ECU 30 receives the frame for providing a display that calls for the driver's attention and displays an alert on the display (S105). The content displayed on the display is, for example, the display shown in FIG. 11A. FIG. 11A is a diagram illustrating an example of the display content that the driver is notified of according to the present embodiment. As illustrated in FIG. 11A, at step S105, the information indicating that an anomalous behavior has been detected and the response taken against the situation (e.g., notifying the center) are displayed.

Gateway 60 notifies the server of the vehicle log including the score (S106).

[1.10 Operation Sequence of Gateway (Case where Score Becomes Less than or Equal to 30)]

FIG. 10 is a diagram illustrating a sequence operations performed by gateway 60 according to the present embodiment. Specifically, FIG. 10 illustrates the sequence of operations performed in response to the score of 31 in gateway 60 having fallen to or below 30 due to a suspicious driving behavior. The roles of ECU 20 and ECU 30 are identical to those described with reference to FIG. 9.

As illustrated in FIG. 10, ECU 20 transmits a frame requesting the emergency brake to be turned on (S110), and gateway 60 receives the transmitted frame requesting the emergency brake to be turned on.

Next, after having transmitted the frame requesting the emergency brake to be turned on, ECU 20 transmits a frame requesting the emergency brake to be turned off (S111), and gateway 60 receives the transmitted frame requesting the emergency brake to be turned off.

Thereafter, ECU 20 transmits again a frame requesting the emergency brake to be turned on (S112), and gateway 60 receives the transmitted frame requesting the emergency brake to be turned on.

Gateway 60 lowers the score by one if the time (an example of the detection interval) from when gateway 60 has received the frame requesting the emergency brake to be turned on at step S110 to when gateway 60 has received the frame requesting the emergency brake to be turned on at step S112 is less than a predetermined value (e.g., five minutes) (S113). The process at step S113 corresponds to the process at step S1104 executed after the determination of Yes has been obtained at step S1107 of FIG. 7.

When the score is lowered by one, the current score becomes 30. Therefore, gateway 60 transmits a frame for transitioning to the degrade mode (a degrade mode requesting frame) (S114). In a case where the degrade mode includes disabling the emergency brake, gateway 60 transmits, to ECU 20, the frame for transitioning to the degrade mode. The process at step S114 corresponds the process at step S1302 of FIG. 8.

ECU 20 receives the transmitted degrade mode requesting frame and disables subsequent transmission of frames requesting the emergency brake to be turned on (S115).

Figure 11B:
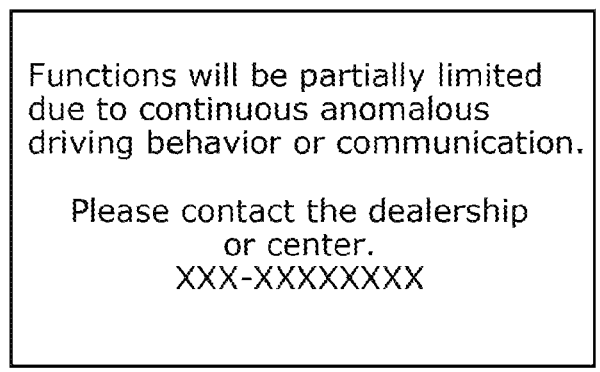
FIG. 11B is a diagram illustrating another example of the display content that a driver is to be notified of according to Embodiment 1.

ECU 30 receives the transmitted degrade mode requesting frame and provides a display for notifying the driver that the functions have been limited on the display (S116). The content displayed on the display is, for example, the display shown in FIG. 11B. FIG. 11B is a diagram illustrating another example of the display content that the driver is notified of according to the present embodiment. As illustrated in FIG. 11B, at step S116, the information indicating that the anomalous behavior is sustained, the information indicating that some of the functions have been limited, and the contact information for inquiry are displayed.

[1.11 Advantageous Effects of Embodiment 1]

Gateway 60 (an example of the vehicle surveillance device) according to Embodiment 1 calculates the score with respect to an activity suspected to be a reverse engineering activity on the in-vehicle network system performed by an attacker. Furthermore, gateway 60 determines one or more responses based on the score. Gateway 60 can notify the server, and then the server can grasp a suspicious vehicle and identify this vehicle as a target of intense surveillance. In addition, with respect to a more suspicious vehicle, gateway 60 can interfere with the reverse engineering activity by limiting some of the functions of the vehicle. This configuration allows gateway 60 to increase the security of the in-vehicle network system.

Embodiment 2

Hereinafter, a vehicle surveillance method in vehicle 200 provided with an in-vehicle network (an in-vehicle network system) via which a plurality of electronic control units (ECUs) communicate with each other will be described. The in-vehicle network system according to the present embodiment has a configuration similar to the configuration of the in-vehicle network system according to Embodiment 1. Therefore, the drawing illustrating the overall configuration of the in-vehicle network system is omitted, and only the flowcharts of the processes of the gateway that differ from the counterparts according to Embodiment 1 will be described.

In the example described according to the present embodiment, the score is raised when a suspicious behavior is detected. In this case, the initial value of the score is, for example, 0. In the following description, the score that is raised when a suspicious behavior is detected is referred to as a suspiciousness score to be differentiated from the score according to Embodiment 1.

[2.1 Flowchart Illustrating Process of Gateway]

Figure 12:
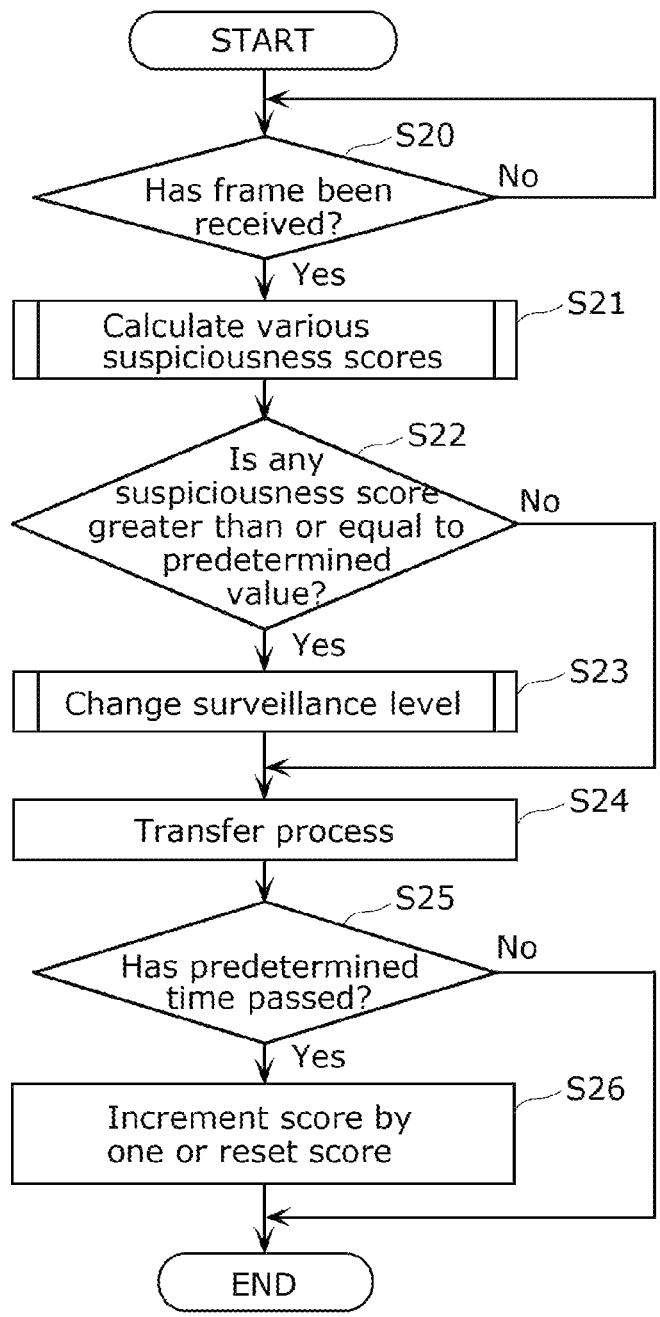
FIG. 12 is a flowchart illustrating a process of a gateway according to Embodiment 2.

FIG. 12 is a flowchart illustrating a process of gateway 60 according to the present embodiment. It is to be noted that steps S20, S24, S25, and S26 shown in FIG. 12 correspond to, respectively, steps S10, S14, S15, and S16 shown in FIG. 6, and thus the descriptions thereof will be omitted or simplified below.

As illustrated in FIG. 12, gateway 60 determines whether gateway 60 has received a frame (S20).

If gateway 60 has received a frame (Yes at S20), gateway 60 calculates various suspiciousness scores (S21). If gateway 60 has not received any frame (No at S20), gateway 60 stands by until gateway 60 receives a frame.

After calculating the suspiciousness scores, gateway 60 determines whether any one of the calculated suspiciousness scores is greater than or equal to a predetermined value (S22).

If any one of the calculated suspiciousness scores is greater than or equal to the predetermined value (Yes at S22), gateway 60 changes the surveillance level (S23).

If all of the suspiciousness scores are less than the predetermined value (No at S22), gateway 60 performs a transfer process (S24) and proceeds to step S25.

[2.2 Flowchart of how Gateway Calculates Suspiciousness Score]

Figure 13:
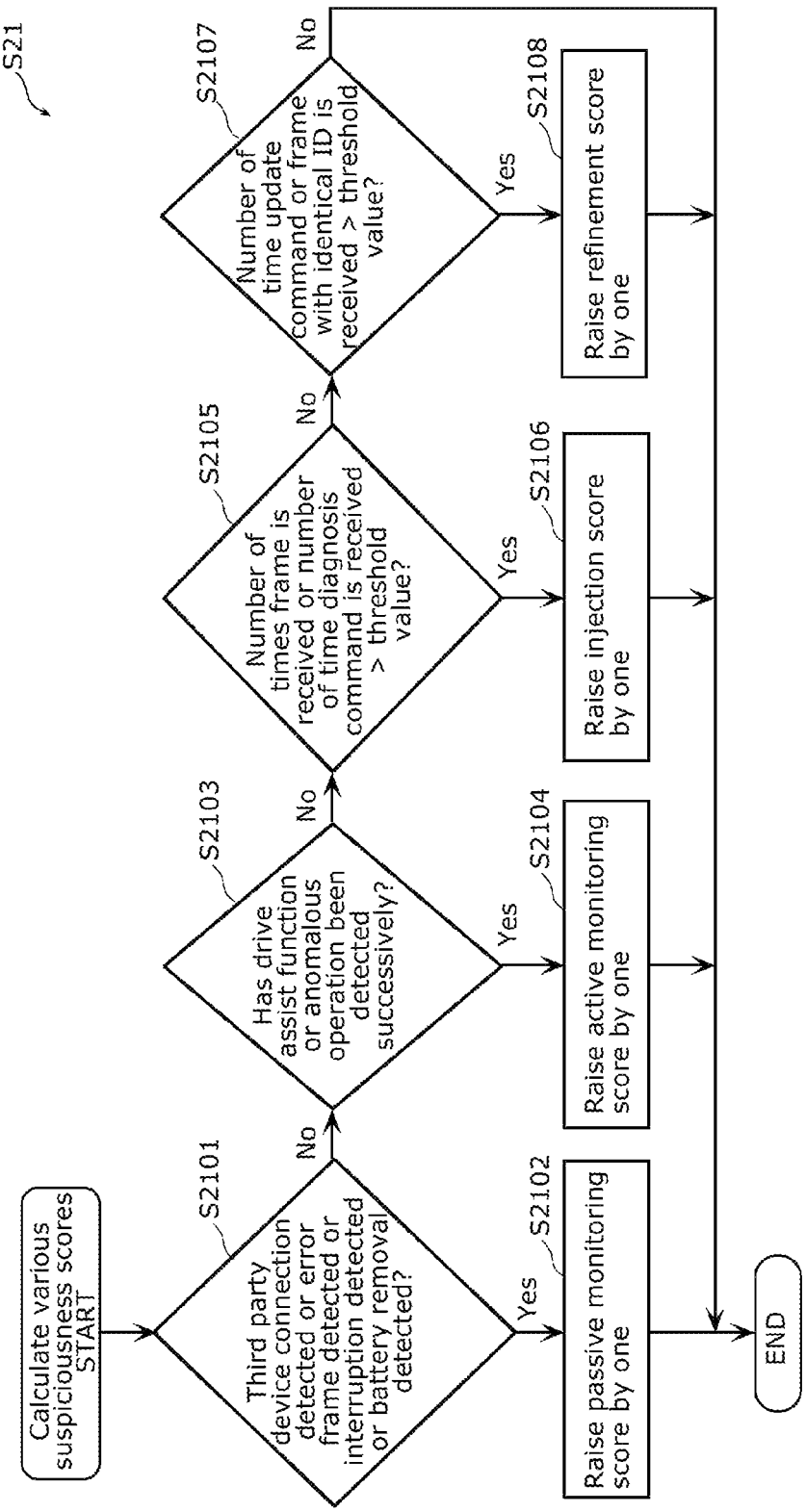
FIG. 13 is a flowchart illustrating how the gateway calculates the suspiciousness score according to Embodiment 2.

FIG. 13 is a flowchart illustrating how gateway 60 calculates the suspiciousness score according to the present embodiment. Specifically, FIG. 13 is a flowchart illustrating the details of the process of calculating the suspiciousness scores at step S21 of FIG. 12.

As illustrated in FIG. 13, gateway 60 determines whether any one of the detection of a connection of a third party device (an example of the surveillance device) to diagnosis port 50, the detection of an error frame, the detection of a network interruption, and the detection of removal of the battery is present at the time when the frame is received (S2101). In addition, gateway 60 may determine whether the stopped time proportion is greater than or equal to a predetermined proportion at step S2101.

If any one of the above is detected at step S2101 (Yes at S2101), gateway 60 detects the suspicious behavior as a passive monitoring activity, raises the passive monitoring score by one (S2102), and terminates the process. The passive monitoring activity is an action for acquiring the vehicle data in the in-vehicle network system, for example. The passive monitoring score represents the suspiciousness score with respect to the passive monitoring activity among the reverse engineering activities performed on the in-vehicle network system. In other words, the passive monitoring score indicates the likelihood that the passive monitoring activity is being performed, and the higher the passive monitoring score, the higher the likelihood that the passive monitoring activity is being performed on vehicle 200. This can be rephrased as, at step S2102, score calculator 63 updates the passive monitoring score held before the frame has been received based on the frame received by frame transmitter and receiver 61 and the vehicle data.

If none of the above is detected at step S2101 (No at S2101), gateway 60 further determines whether the drive assist function, such as the emergency braking, being turned on has been detected repeatedly or an anomalous operation, such as sudden braking, has been detected repeatedly (S2103). For example, at step S2103, gateway 60 determines whether either one of the number of times the drive assist function has been activated within the predetermined first time and the number of times an anomalous driving behavior has been detected within the predetermined first time is greater than or equal to a predetermined number. In addition, gateway 60 may determine whether any one of the number of times the drive assist function has been activated, the number of times a button inside the vehicle has been operated, and the number of times an anomalous driving behavior has been detected is greater than or equal to a predetermined number.

If any one of the above is detected at step S2103 (Yes at S2103), gateway 60 detects this suspicious behavior as an active monitoring activity, raises the active monitoring score by one (S2104), and terminates the process. The active monitoring activity is an operation for acquiring the vehicle data of the in-vehicle network under a specific circumstance or while a specific function of vehicle 200 is in operation, for example. The active monitoring score represents the suspiciousness score with respect to the active monitoring activity among the reverse engineering activities performed on the in-vehicle network system. In other words, the active monitoring score indicates the likelihood that the active monitoring activity is being performed, and the higher the active monitoring score, the higher the likelihood that the active monitoring activity is being performed on vehicle 200. This can be rephrased as, at step S2104, score calculator 63 updates the active monitoring score held before the frame has been received based on the frame received by frame transmitter and receiver 61 and the vehicle data.

If none of the above is detected at step S2103 (No at S2103), gateway 60 further determines whether the number of times a frame is received or the number of times a diagnosis command is received is greater than a predetermined threshold value (S2105). The number of times a frame or a diagnosis command is received is an example of the amount of the received frame or diagnosis command.

If either one of the numbers is greater than the predetermined threshold value at step S2105 (Yes at S2105), gateway 60 detects this suspicious behavior as an injection activity, raises the injection score by one (S2106), and terminates the process. The injection activity is an action of attempting to inject a frame into the in-vehicle network system, for example. In other words, the injection activity indicates that an attacker is attempting to inject an unauthorized frame.

The injection score represents the suspiciousness score with respect to the injection activity among the reverse engineering activities performed on the in-vehicle network system. In other words, the injection score indicates the likelihood that the injection activity is being performed, and the higher the injection score, the higher the likelihood that the injection activity is being performed on vehicle 200. This can be rephrased as, at step S2106, score calculator 63 updates the injection score held before the frame has been received based on the frame received by frame transmitter and receiver 61 and the vehicle data.

If both of the numbers are less than or equal to the threshold value at step S2105 (No at S2105), gateway 60 further determines whether the number of times an update command or a frame with an identical ID has been received exceeds a predetermined threshold value (S2107). In this example, the frame with an identical ID is an example of the frame with an identical attribute. At step S2107, the determination may be made based on the number of times a frame with an identical attribute has been received. Herein, the number of times such a frame is received is an example of the amount of the received frame.

If the number of times an update command or a frame with an identical ID has been received exceeds the predetermined threshold value at step S2107 (Yes at S2107), gateway 60 detects this suspicious behavior as a refinement activity, raises the refinement score by one (S2108), and terminates the process. The refinement activity is an action of attempting to inject a frame for improving the accuracy of another frame to be injected into the in-vehicle network system, for example. In other words, the refinement activity indicates that the content of the attack perpetrated by the attacker is more sophisticated than that in the injection activity.

The refinement score represents the suspiciousness score with respect to the refinement activity among the reverse engineering activities performed on the in-vehicle network system. In other words, the refinement score indicates the likelihood that the refinement activity is being performed, and the higher the refinement score, the higher the likelihood that the refinement activity is being performed on vehicle 200. This can be rephrased as, at step S2108, score calculator 63 updates the refinement score held before the frame has been received based on the frame received by frame transmitter and receiver 61 and the vehicle data.

If the number of times an update command or a frame with an identical ID has been received is less than or equal to the predetermined threshold value at step S2107 (No at S2107), score calculator 63 terminates the process without any further operation.

In this example, the connection of a third party device can be detected when a specific diagnosis command flows from diagnosis port 50. An error frame can be detected through an error counter or an error interrupt process of gateway 60. The network interruption can be detected if, with the time at which a frame is received being retained constantly, the difference between the time at which a frame was received last time and the current time exceeds a predetermined threshold value when a frame is received. Removal of the battery can be detected if, when the power supply to gateway 60 is shut off and then resumes, the preceding shutoff of the power supply is detected.

As described above, according to the present embodiment, gateway 60 (more specifically, score calculator 63) calculates the suspiciousness score for each of the passive monitoring activity, the active monitoring activity, the injection activity, and the refinement activity indicating the respective stages of reverse engineering. The passive monitoring activity, the active monitoring activity, the injection activity, and the refinement activity are examples of a plurality of types of reverse engineering indicating the respective stages of the reverse engineering. In other words, there are a plurality of types of suspicious behaviors. Then, score calculator 63 calculates the suspiciousness score for each of the plurality of types of suspicious behaviors.

In this example, it suffices that the plurality of types include two or more types. For example, it suffices that the plurality of types of suspicious behaviors include at least two selected from the passive monitoring activity, the active monitoring activity, the injection activity, and the refinement activity, for example. To rephrase, it suffices that score calculator 63 make the determination at at least two of steps S2101, S2103, S2105, and S2107 of FIG. 13. For example, it suffices that score calculator 63 can detect, as a suspicious behavior, at least two selected from the passive monitoring activity, the active monitoring activity, the injection activity, and the refinement activity, for example.

In this example, the reverse engineering activity is more advanced in order of the refinement activity, the injection activity, the active monitoring activity, and the passive monitoring activity. In other words, the analysis of the in-vehicle network is more advanced in this order.

[2.3 Flowchart of how Gateway Changes Surveillance Level]

Figure 14:
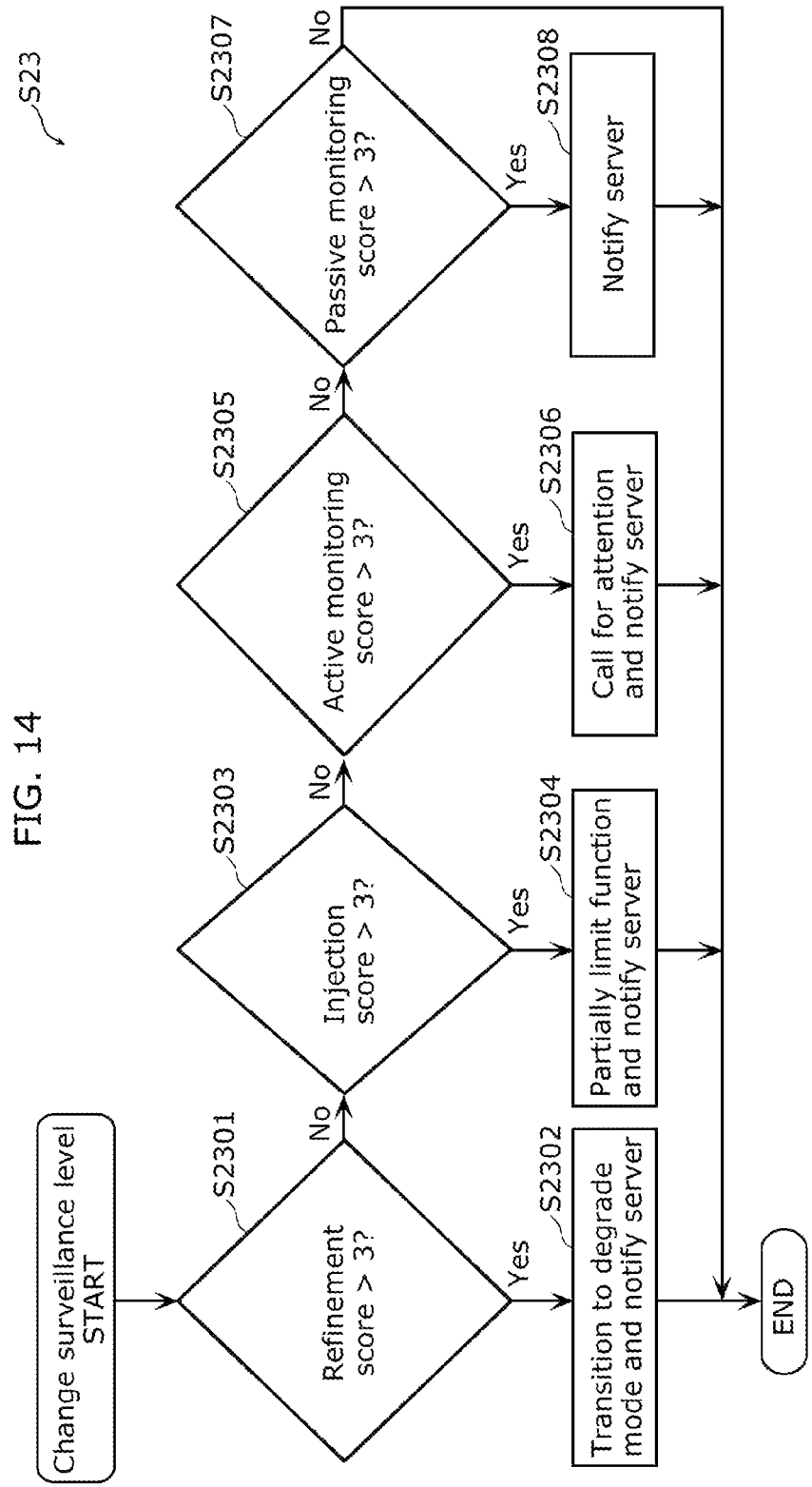
FIG. 14 is a flowchart illustrating how the gateway changes the surveillance level according to Embodiment 2.

FIG. 14 is a flowchart illustrating how gateway 60 changes the surveillance level according to the present embodiment. Specifically, FIG. 14 is a flowchart illustrating the details of the process of changing the surveillance level at step S23 of FIG. 12. The operation illustrated in FIG. 14 is executed by surveillance controller 64, for example.

As illustrated in FIG. 14, gateway 60 determines whether the refinement score is greater than 3 (S2301). This value 3 is a fourth threshold value for determining whether there is a likelihood that the refinement activity is being performed and is stored in advance in score holder 68, for example. It is to be noted that the fourth threshold value is not limited to 3.

If the refinement score is greater than 3 (Yes at S2301), gateway 60 transmits a request frame for transitioning to the degrade mode to each ECU, notifies the server of the vehicle data including each suspiciousness score (S2302), and terminates the process.

If the refinement score is less than or equal to 3 (No at S2301), gateway 60 further determines whether the injection score is greater than 3 (S2303). This value 3 is a fifth threshold value for determining whether there is a likelihood that the injection activity is being performed and is stored in advance in score holder 68, for example. It is to be noted that the fifth threshold value is not limited to 3.

If the injection score is greater than 3 (Yes at S2303), gateway 60 limits a part of the functions of vehicle 200, notifies the server of the vehicle data including each suspiciousness score (S2304), and terminates the process.

If the injection score is less than or equal to 3 (No at S2303), gateway 60 further determines whether the active monitoring score is greater than 3 (S2305). This value 3 is a sixth threshold value for determining whether there is a likelihood that the active monitoring activity is being performed and is stored in advance in score holder 68, for example. It is to be noted that the sixth threshold value is not limited to 3.

If the active monitoring score is greater than 3 (Yes at S2305), gateway 60 transmits a frame for calling for the driver's attention, notifies the server of the vehicle data including each suspiciousness score (S2306), and terminates the process.

If the active monitoring score is less than or equal to 3 (No at S2305), gateway 60 further determines whether the passive monitoring score is greater than 3 (S2307). This value 3 is a seventh threshold value for determining whether there is a likelihood that the passive monitoring activity is being performed and is stored in advance in score holder 68, for example. It is to be noted that the seventh threshold value is not limited to 3.

If the passive monitoring score is greater than 3 (Yes at S2307), gateway 60 notifies the server of the vehicle data including each suspiciousness score (S2308) and terminates the process.

If the passive monitoring score is less than or equal to 3 (No at S2307), gateway 60 terminates the process without any further operation.

In this manner, surveillance controller 64 executes one or more of limiting a part of the functions of vehicle 200, calling for the attention of the driver of vehicle 200, and notifying a nearby vehicle or the server of the score based on the plurality of types of suspicious behaviors and the suspiciousness scores (examples of the score) corresponding to the respective types of suspicious behaviors. In addition, surveillance controller 64 may execute the enhancement of surveillance of the in-vehicle network. For example, surveillance controller 64 executes one or more of limiting a part of the functions of vehicle 200, calling for the attention of the driver of vehicle 200, notifying a nearby vehicle or the server of the score, and enhancing the surveillance of the in-vehicle network so as to raise the surveillance level as the stage of the reverse engineering activity becomes more advanced.

If the refinement score is greater than the fourth threshold value, surveillance controller 64 executes an operation corresponding to a fourth surveillance level. In addition, if the injection score is greater than the fifth threshold value and if the refinement score is less than or equal to the fourth threshold value, surveillance controller 64 executes an operation corresponding to a fifth surveillance level that is lower than the surveillance level of the fourth surveillance level. In addition, if the active monitoring score is greater than the sixth threshold value, if the refinement score is less than or equal to the fourth threshold value, and if the injection score is less than or equal to the fifth threshold value; surveillance controller 64 executes an operation corresponding to a sixth surveillance level that is lower than the surveillance level of the fifth surveillance level. In addition, if the passive monitoring score is greater than the seventh threshold value, if the refinement score is less than or equal to the fourth threshold value, if the injection score is less than or equal to the fifth threshold value, and if the active monitoring score is less than or equal to the sixth surveillance level; surveillance controller 64 executes an operation corresponding to a seventh surveillance level that is lower than the surveillance level of the sixth surveillance level.

In this example, the fourth threshold value takes a value that is greater than the minimum value (e.g., 0, which is the initial value) of the refinement score and less than or equal to the maximum value (e.g., 100) of the refinement score, for example. The fifth threshold value takes a value that is greater than the minimum value (e.g., 0, which is the initial value) of the injection score and less than or equal to the maximum value (e.g., 100) of the injection score, for example. The sixth threshold value takes a value that is greater than the minimum value (e.g., 0, which is the initial value) of the active monitoring score and less than or equal to the maximum value (e.g., 100) of the active monitoring score, for example. The seventh threshold value takes a value that is greater than the minimum value (e.g., 0, which is the initial value) of the passive monitoring score and less than or equal to the maximum value (e.g., 100) of the passive monitoring score, for example.

In this example, the operations corresponding to the fourth surveillance level, the fifth surveillance level, the sixth surveillance level, and the seventh surveillance level are stored in advance in score holder 68.

[2.4 Advantageous Effects of Embodiment 2]

Gateway 60 (an example of the vehicle surveillance device) according to Embodiment 2 calculates the suspiciousness score in accordance with the phase of the activity with respect to the activity suspected to be a reverse engineering activity on the in-vehicle network system performed by an attacker. Gateway 60 further determines how to respond to the attack based on the values of the various suspiciousness scores. This configuration makes it possible to conduct more intense surveillance of vehicle 200 suspected of being in more advanced attack phase and can thus further increase the security of the in-vehicle network system.

[Other Variations]

The present disclosure has been described based on the foregoing embodiments. It is needless to say, however, that the present disclosure is not limited to the foregoing embodiments. The cases such as the following are also encompassed by the present disclosure.

(1) According to the foregoing embodiments, each bus is a CAN, but the communication protocol is not limited to the CAN. For example, the communication protocol may be a CAN with flexible data rate (CAN-FD), FlexRay, or Ethernet.

(2) According to the foregoing embodiments, the server communicator is a constituent element of the gateway. Alternatively, the server communicator does not need to be an essential constituent element of the gateway. For example, another device that communicates with the server may be provided, and the gateway may carry out notification via this device.

(3) According to the foregoing embodiments, the score calculator is a constituent element of the gateway, but the score calculator does not necessarily need to be a constituent element of the gateway. For example, the score calculator may be a constituent element of another ECU, or the score calculator may function as an application on a virtual machine.

(4) According to the foregoing embodiments, the score can take a value from 0 to 100, but the possible values of the score are not limited thereto. For example, the score may take a value from 0 to 10 or any other value that can indicate stepwise the level at which the reverse engineering is suspected.

(5) In the examples according to the foregoing embodiments, with the initial value of the score set to 100, the score is lowered when a suspicious behavior is observed, but such a score does not need to be the score. The suspiciousness score may instead be used, and the suspiciousness score may be raised when a suspicious behavior is observed. The score may take any value that can indicate stepwise the level at which the reverse engineering is suspected.

(6) According to the foregoing embodiments, conditions based on which the score is lowered have been described. Alternatively, there may be conditions based on which the score is raised. For example, the score may be raised each time one day (an example of the predetermined second time) passes, or the score may be raised when the ignition is turned on. Moreover, for example, the score may be reset each time one day (an example of the predetermined third time) passes. Furthermore, the score may be reset through a diagnosis command, or the score may be reset based on a notification from the server. With this configuration, even in a case where the score has become low as a behavior that can seem suspicious is repeated by a legitimate driver by accident, the score can be restored to its proper value.

(7) According to the foregoing embodiments, the score is lowered by one in response to a match to a condition for lowering the score, but the amount by which the score is lowered is not limited to one. For example, the amount by which the score is lowered may be varied depending on the observed suspicious behavior, or the amount by which the score is lowered may be increased as suspicious behaviors are observed repeatedly. This configuration allows the score to be lowered by a greater amount for a suspicious behavior that is not very likely to be observed in a normal use, which provides an advantage in that a suspicious vehicle can be identified more easily.

(8) According to the foregoing embodiments, the conditions based on which the score is lowered are treated equally.

Alternatively, the conditions may be classified into phases, and the score may be calculated for each phase. For example, an attack may be classified into one of the stages including passive monitoring in which the attacker simply attempts to acquire a log of the in-vehicle network, active monitoring in which the attacker attempts to acquire a log of the in-vehicle network while a specific function of the vehicle is in operation or under a specific circumstance, injection in which the attacker attempts to inject a frame into the log of the in-vehicle network, and refinement in which the attacker attempts a more sophisticated attack. This classification makes it possible to capture the phase of reverse engineering performed by the attacker, which provides an advantage in that an attacker in a more advanced phase can be placed under intense surveillance. The passive monitoring may be determined based on, for example but not limited to, the detection of a connection of a third party device to the diagnosis port, an interruption of the network for connecting a monitoring device (an example of the surveillance device), removal of the battery, the number of times an error frame is detected or the interval at which an error frame is detected. The active monitoring may be determined based on, for example but not limited to, the interval at which or the amount by which the drive assist function is used, the number of times a button provided inside the vehicle is pressed per unit time, the frequency at which an unusual accelerator operation, an unusual brake operation, or an unusual steering wheel operation is observed. The injection may be determined based on, for example but not limited to, the amount by which or the interval at which a frame is received or the amount by which or the interval at which a diagnosis command is received. The refinement may be determined based on, for example but not limited to, an increase in the amount of received frames with an identical ID, a change in the interval at which a frame with an identical ID is received, or the amount of received update commands, or the interval at which an update command is received.

(9) According to the foregoing embodiments, the present value and the previous value of the vehicle data to be used to calculate the score are held in the score holder. Alternatively, not the previous value but the actual record indicating that the score has been lowered in the past may be held in the score holder. For example, the amount by which the score has been lowered in the past one week may be held in the score holder. Then, in a case where the actual record indicating that the score has been lowered in the past is stored in the score holder, the score calculator may set the amount by which the score is lowered when a suspicious behavior for which the score has actually been lowered in the past is observed to an amount that is greater than the amount by which the score is lowered as set in advance or the amount by which the score is lowered when a suspicious behavior for which the score has never been lowered in the past or has been lowered by a small amount is observed. This configuration advantageously makes it possible to determine that the likelihood that the reverse engineering has been performed is higher when a suspicious behavior is observed repeatedly.

(10) According to the foregoing embodiments, the score is sent to the server, but the destination to which the score is sent is not limited to the server. The score may be sent to a nearby vehicle or a roadside unit via V2X communication. This configuration makes it possible to find a suspicious vehicle regarding which the score cannot be sent to the server due to the internet connection being disconnected, which provides an advantage in that the security can be improved.

(11) According to the foregoing embodiments, the score is calculated based on the log of the in-vehicle network frames. Alternatively, the score of a nearby vehicle may be used to calculate the score of the host vehicle. For example, in a case where a plurality of vehicles each having a score of less than or equal to a predetermined value are present within a predetermined region for a predetermined period, the score calculator may determine that it is highly likely that the attacker is targeting also the host vehicle as a vehicle for the analysis and may correct (e.g., lower) the score. For example, in a case where a plurality of vehicles (also referred to as other vehicles) each having any one of the scores corresponding to the respective types of suspicious behaviors that is less than or equal to a predetermined value are present within a predetermined region for a predetermined period, the score calculator may correct (e.g., lower) the score of the host vehicle in accordance with the type of the suspicious behavior for which the score is less than or equal to the predetermined value. For example, the score calculator may lower the score of the host vehicle for the type of suspicious behavior that is identical to the type of the suspicious behavior for which the score is less than or equal to the predetermined value in the other vehicles.

(12) According to Embodiment 2 described above, the suspiciousness score is calculated in order of the passive monitoring score, the active monitoring score, the injection score, and the refinement score when the suspiciousness score is calculated, but this order does not limit the order of the processes. In a similar manner, the above order does not limit the order of the processes of determining the suspiciousness scores when the surveillance level is changed. For example, the order of the processes may be reversed from the above order, or the score may be calculated and the surveillance level may be changed after all the determination processes have been executed.

(13) According to Embodiments 1 and 2 described above, the server is notified when the score (the suspiciousness score) has fallen below (exceeded) a predetermined threshold value, but the timing at which the server is notified is not limited thereto. For example, the server may be notified of the vehicle log periodically, and the frequency at which or the amount by which the server is notified may be changed in accordance with the value of the score (the suspiciousness score). With this configuration, a more detailed vehicle log on a suspicious vehicle can be sent to the server, which provides an advantage in that intense surveillance can be implemented. In addition, the vehicle log may include not only the score (the suspiciousness score) of the vehicle but also information acquired from frames flowing over the in-vehicle network system. For example, the vehicle log may include sensor information of the vehicle, such as the speed or the steering angle of the vehicle, as well as the vehicle data stored in the score holder and based on which the score is changed.

(14) According to the foregoing embodiments, the score is calculated when a frame is received, but the score does not need to be calculated when a frame is received. For example, the score may be calculated periodically in accordance with a built-in timer.

(15) According to the foregoing embodiments, the threshold value of the score is set when the surveillance level is changed, but the threshold value is not limited to the values indicated in the foregoing embodiments. The threshold value may be set high (or low) in order to raise the sensitivity of detection of or response to a suspicious vehicle or in order to lower such sensitivity. In addition, the threshold value may be changed dynamically in accordance with the status (e.g., the speed at which the score changes, the stage of the reverse engineering, or the like) of the reverse engineering.

(16) According to Embodiment 2 described above, the refinement score is raised based on the amount of received frames with an identical ID. Alternatively, the refinement score may be raised based on the amount of received frames with an identical port number, an identical IP address, or an identical MAC address in the case of Ethernet. Alternatively, the refinement score may be raised based on the amount of received identical flows defined by the combination of these pieces of header information. In addition, the amount of received frames may be measured by either one of the number of the received packets or the size of the received data.

(17) According to Embodiments 1 and 2 described above, the conditions based on which the score (the suspiciousness score) is calculated or the content of the process corresponding to the score may be stored in the form of a separate rule.

(18) According to Embodiments 1 and 2 described above, the score (the suspiciousness score) is stored in a non-volatile memory and retained even after the ignition is turned off. Alternatively, the score (the suspiciousness score) may not be stored in a non-volatile memory and may be reset each time the ignition is turned off. This configuration renders a non-volatile memory unnecessary, and the vehicle surveillance device can be achieved at a lower cost.

(19) According to the foregoing embodiments, responses such as notifying the server, limiting the functions of the vehicle, or notifying the driver are carried out in accordance with the value of the score (the suspiciousness score), but these responses are not limiting. For example, an intrusion detection system may be included in the in-vehicle network, and the intrusion detection system may be enabled. With this configuration, the intrusion detection system does not need to be in operation in a normal state, which can advantageously save power. Alternatively, the log of the in-vehicle network may start being stored. This configuration makes it possible to store the log of the in-vehicle network when a suspicious behavior arises, which advantageously can reduce the amount of memory to be used. Alternatively, the amount by which or the frequency at which the server is notified of the log of the in-vehicle network may be changed. With this configuration, a larger amount of information can be acquired from a suspicious vehicle, and only a smaller amount of information is acquired from a normal vehicle (the vehicle of which the score is greater than or equal to a predetermined value and that is not suspected of being reverse engineered), which can advantageously reduce the amount of communication. Alternatively, a call may be made to a call center. This configuration can divert the activity of the attacker, which can advantageously stop the reverse engineering.

(20) According to the foregoing embodiments, no mode is set in particular when the score is calculated, but there may be a mode for calculating the score. For example, a test mode may be provided in order to keep the score from being calculated low in a test vehicle repeatedly subjected to a collision test. In the test mode, the score is set to be lowered less for an anomalous behavior. The test mode may be activated through authentication with the server, and the score of the vehicle in the test mode may be grasped by the server.

(21) According to the foregoing embodiments, described are security measures in an in-vehicle network provided in an automobile, but the applicable scope of the gateway according to the foregoing embodiments is not limited thereto. The gateway may be applied not only to automobiles but also to mobilities, including construction machines, agricultural machines, ships, railroad vehicles, or aircrafts.

In other words, the gateway according to the foregoing embodiments can be applied as a cybersecurity measure in a mobility network and a mobility network system.

Moreover, the gateway according to the foregoing embodiments may be applied to a communication network used in an industrial control system of a plant, a building, or the like or to a communication network for controlling an embedded device.

(22) Each device according to the foregoing embodiment is specifically a computer system that includes, for example, a microprocessor, a ROM, a RAM, a hard disk unit, a display unit, a keyboard, and a mouse. The RAM or the hard disk unit has a computer program recorded thereon. The microprocessor operates in accordance with the computer program, and thus each device implements its function. In this example, a computer program includes a set of command codes providing instructions to a computer to implement a predetermined function.

(23) A part or the whole of the constituent elements included in each device according to the foregoing embodiment may be implemented by a single system large scale integration (LSI). A system LSI is an ultra-multifunctional LSI manufactured by integrating a plurality of components on a single chip and is specifically a computer system that includes, for example, a microprocessor, a ROM, and a RAM. The RAM has a computer program recorded thereon. The microprocessor operates in accordance with the computer program, and thus the system LSI implements its function.

Each unit of the constituent elements of each device described above may be implemented by a single chip, or a part or the whole of such constituent elements may be implemented by a single chip.

Although the term the system LSI is used herein, depending on the difference in the degree of integration, it may also be called an IC, an LSI, a super LSI, or an ultra LSI. The technique for circuit integration is not limited to the LSI, and an integrated circuit may be implemented by a dedicated circuit or a general purpose processor. A field programmable gate array (FPGA) that can be programmed after an LSI is manufactured or a reconfigurable processor in which the connection or the setting of the circuit cells within the LSI can be reconfigured may also be used.

Furthermore, when a technique for circuit integration that replaces an LSI appears through the advancement in the semiconductor technology or a derived different technique, the functional blocks may be integrated by using such a different technique. An application of biotechnology is a possibility.

(24) A part or the whole of the constituent elements in each device described above may be implemented by an IC card or a single module that can be attached to or detached from each device. The IC card or the module is a computer system that includes, for example, a microprocessor, a ROM, and a RAM. The IC card or the module may include the ultra-multifunctional LSI described above. The microprocessor operates in accordance with a computer program, and thus the IC card or the module implements its function. The IC card or the module may be tamper resistant.

(25) The present disclosure may be implemented as the methods described above. In addition, the present disclosure may provide a computer program that causes a computer to implement the aforementioned methods or digital signals composed of the computer program.

The present disclosure may also be implemented in the form of a computer readable recording medium having the computer program or the digital signals recorded thereon, and examples of such a computer readable recording medium include a flexible disk, a hard disk, a CD-ROM, an MO, a DVD, a DVD-ROM, a DVD-RAM, a Blue-ray (BD) (registered trademark) disc, and a semiconductor memory. Moreover, the present disclosure may be the digital signals recorded one any of the aforementioned recording media.

According to the present disclosure, the computer program or the digital signals may be transmitted via an electric communication circuit, a wireless or wired communication circuit, a network represented by the internet, data broadcast, or the like.

The present disclosure may provide a computer system that includes a microprocessor and a memory. The memory may have the computer program described above recorded thereon, and the microprocessor may operate in accordance with the computer program.

Alternatively, the program or the digital signals may be recorded onto a recording medium, which may then be transported, or the program or the digital signals may be transported via a network or the like. Thus, the program or the digital signals may be executed by a separate stand-alone computer system.

(26) The foregoing embodiments and modifications may be combined.

INDUSTRIAL APPLICABILITY

The present disclosure can find its effective use in a mobility that is likely to be subjected to a reverse engineering activity performed by an attacker.

The invention claimed is:

1. A vehicle surveillance device that conducts surveillance of an in-vehicle network system including one or more electronic control units, the vehicle surveillance device comprising:
   a frame receiver that receives a frame flowing over the in-vehicle network system; and
   a score calculator that:
      detects a suspicious behavior different from a normal driving behavior based on the frame received by the frame receiver and vehicle data including information on one or more frames received by the frame receiver prior to receiving the frame; and
      calculates, based on a detection result, a score indicating a likelihood that reverse engineering has been performed on a vehicle provided with the in-vehicle network system, wherein
   the reverse engineering includes an activity performed by an attacker in a stage of investigating the in-vehicle network system, before gaining unauthorized control of the vehicle,
   the suspicious behavior detected is classified into a stage among a plurality of stages in the reverse engineering,
   the score calculator calculates the score for each of the plurality of stages,
   the plurality of stages includes at least two stages selected among a passive monitoring, an active monitoring, an injection, and a refinement,
   the passive monitoring is a stage that attempts to acquire the vehicle data,
   the active monitoring is a stage that attempts to acquire the vehicle data under a specific circumstance or while a specific function of the vehicle is in operation,
   the injection is a stage that attempts to inject a frame into the in-vehicle network system, and
   the refinement is a stage that attempts to inject a frame that improves an accuracy of another frame to be injected into the in-vehicle network system.

2. The vehicle surveillance device according to claim 1, wherein
   the suspicious behavior is classified into the passive monitoring when any one of a connection of a surveillance device, an error frame, a network interruption, and battery removal is detected, and
   the score calculator lowers the score for the passive monitoring in response to classifying into the passive monitoring.

3. The vehicle surveillance device according to claim 1, wherein
   the suspicious behavior is classified into the active monitoring (i) when either one of a total number of times a button inside the vehicle is operated within a predetermined first time and a total number of times an anomalous driving behavior is detected within the predetermined first time is greater than or equal to a predetermined number or (ii) when an interval at which a drive assist function is activated within the predetermined first time is less than a predetermined value,
   the drive assist function is any one of automatic parking assist, auto cruise control, emergency braking, and lane keep assist,
   the anomalous driving behavior is defined as an accelerator position, a brake pressure, or an amount of change in a steering angle within a predetermined time is greater than or equal to a predetermined value, and
   the score calculator lowers the score for the active monitoring in response to classifying into the active monitoring.

4. The vehicle surveillance device according to claim 1, wherein
   the suspicious behavior is classified into the injection when either one of an amount of the frame received within a predetermined first time and an amount of a diagnosis command received within the predetermined first time is greater than or equal to a predetermined number, and
   the score calculator lowers the score for the injection in response to classifying into the injection.

5. The vehicle surveillance device according to claim 1, wherein
   the suspicious behavior is classified into the refinement when either one of an amount of an update command received within a predetermined first time and an amount of a frame with an identical attribute received within the predetermined first time is greater than or equal to a predetermined number,
   the frame with the identical attribute is a frame that includes an identical identifier, an identical IP address, an identical MAC address, or an identical port number or a frame that includes two or more of an identical identifier, an identical IP address, an identical MAC address, and an identical port number, and
   the score calculator lowers the score for the refinement in response to classifying into the refinement.

6. The vehicle surveillance device according to claim 1, further comprising:
a surveillance level changer, wherein
in response to the score falling below a predetermined value, the surveillance level changer executes, based on a value of the score, any one or more of limiting a function of the vehicle, calling for an attention of a driver of the vehicle, sending the score to a nearby vehicle or a server, and enhancing surveillance of the in-vehicle network system.

7. The vehicle surveillance device according to claim 1, wherein
the suspicious behavior is classified into:
the passive monitoring when any one of a connection of a surveillance device, an error frame, a network interruption, and battery removal is detected;
the active monitoring when any one of a total number of times a drive assist function is activated within a predetermined first time, a total number of times a button inside the vehicle is operated within the predetermined first time, and a total number of times an anomalous driving behavior is detected within the predetermined first time is greater than or equal to a predetermined number;
the injection when either one of a total number of times the frame is received within the predetermined first time and a total number of times a diagnosis command is received within the predetermined first time is greater than or equal to a predetermined number; and
the refinement when either one of a total number of times an update command is received within the predetermined first time and a total number of times a frame with an identical attribute is received within the predetermined first time is greater than or equal to a predetermined number.

8. The vehicle surveillance device according to claim 1, wherein
the vehicle surveillance device further includes a surveillance level changer, and
the surveillance level changer executes any one or more of limiting a part of a function of the vehicle, calling for an attention of a driver of the vehicle, and sending the score to a nearby vehicle or a server based on the plurality of stages and a value of the score corresponding to each of the plurality of stages.

9. The vehicle surveillance device according to claim 1, wherein
the score calculator raises the score in response to passing of a predetermined second time or in response to a predetermined first operation being executed on the vehicle.

10. The vehicle surveillance device according to claim 1, wherein
the score calculator resets the score in response to passing of a predetermined third time or in response to a predetermined second operation being executed on the vehicle.

11. The vehicle surveillance device according to claim 1, wherein the score calculator calculates a current score by performing a calculation on an immediately previous score, based on frame time-series data including a frame received most recently by the frame receiver and the one or more frames received by the frame receiver before the most recent frame.

12. A vehicle surveillance method of conducting surveillance of an in-vehicle network system including one or more electronic control units, the vehicle surveillance method comprising:
receiving a frame flowing over the in-vehicle network system; and
detecting a suspicious behavior different from a normal driving behavior based on the frame received in the receiving and vehicle data including information on one or more frames received prior to the frame received in the receiving, and calculating, based on a detection result, a score indicating a likelihood that reverse engineering has been performed on a vehicle provided with the in-vehicle network system,
wherein
the reverse engineering includes an activity performed by an attacker in a stage of investigating the in-vehicle network system, before gaining unauthorized control of the vehicle,
the suspicious behavior detected is classified into a stage among a plurality of stages in the reverse engineering,
in the calculating, calculating the score for each of the plurality of stages,
the plurality of stages includes at least two stages selected among a passive monitoring, an active monitoring, an injection, and a refinement,
the passive monitoring is a stage that attempts to acquire the vehicle data,
the active monitoring is a stage that attempts to acquire the vehicle data under a specific circumstance or while a specific function of the vehicle is in operation,
the injection is a stage that attempts to inject a frame into the in-vehicle network system, and
the refinement is a stage that attempts to inject a frame that improves an accuracy of another frame to be injected into the in-vehicle network system.

* * * * *